United States Patent [19]
Gill et al.

[11] Patent Number: 5,831,934
[45] Date of Patent: Nov. 3, 1998

[54] SIGNAL PROCESSING METHOD FOR IMPROVED ACOUSTIC FORMATION LOGGING SYSTEM

[76] Inventors: Stephen P. Gill, 32 Flood Cir., Aherton, Calif. 94027; Timothy Prowten, 4501 Alex Dr., San Jose, Calif. 95130; Marek Z. Kozak, 4994 Hildasue Ter., Fremont, Calif. 94555

[21] Appl. No.: 901,230

[22] Filed: Jul. 24, 1997

Related U.S. Application Data

[62] Division of Ser. No. 535,968, Sep. 28, 1995.

[51] Int. Cl.⁶ .......................................................... G01V 1/40
[52] U.S. Cl. .............................. 367/25; 367/43; 364/422
[58] Field of Search .................................. 367/25, 43, 48; 364/422, 724.01, 724.06

[56] References Cited

U.S. PATENT DOCUMENTS 4,852,068  7/1989  Track ........................................ 364/422

*Primary Examiner*—Ian J. Lobo
*Attorney, Agent, or Firm*—Owen, Wickersham & Erickson, P.C.

[57] ABSTRACT

A method for analyzing received wave signal data in an acoustic logging system that includes a logging tool adapted to be moved through a borehole in the earth and comprising a transmitter section and receiver section, wherein the transmitter section produces sonic waves at periodic intervals which are received as wave signal data by the receiver section. The method comprises the steps of processing the received wave signal data using Fourier Transform procedures, filtering the processed data using a Heisenberg filter procedure, using a Hilbert transform to refine the filtered data, and using the refined data to provide a phase velocity analysis.

4 Claims, 29 Drawing Sheets

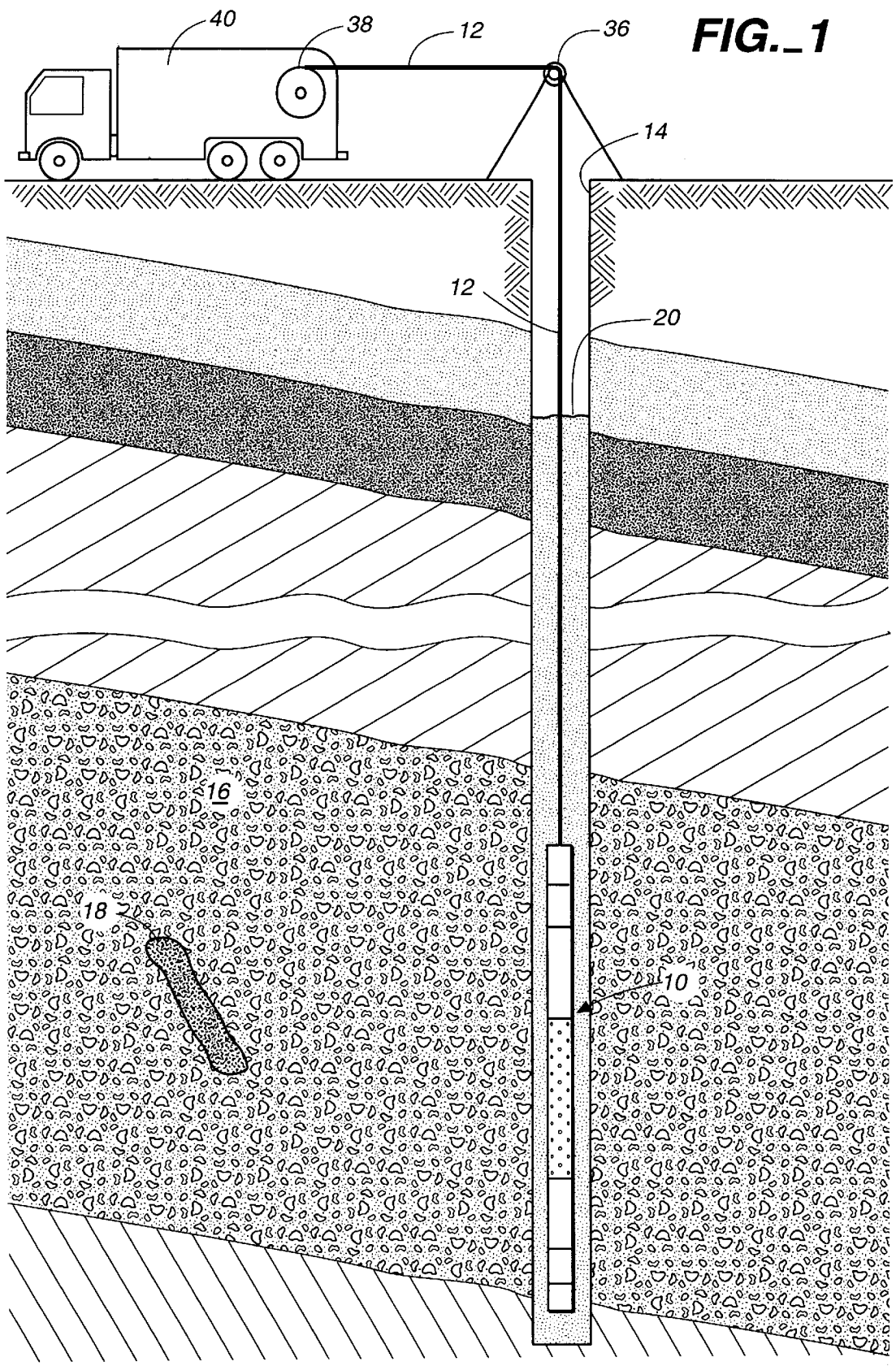
FIG._1

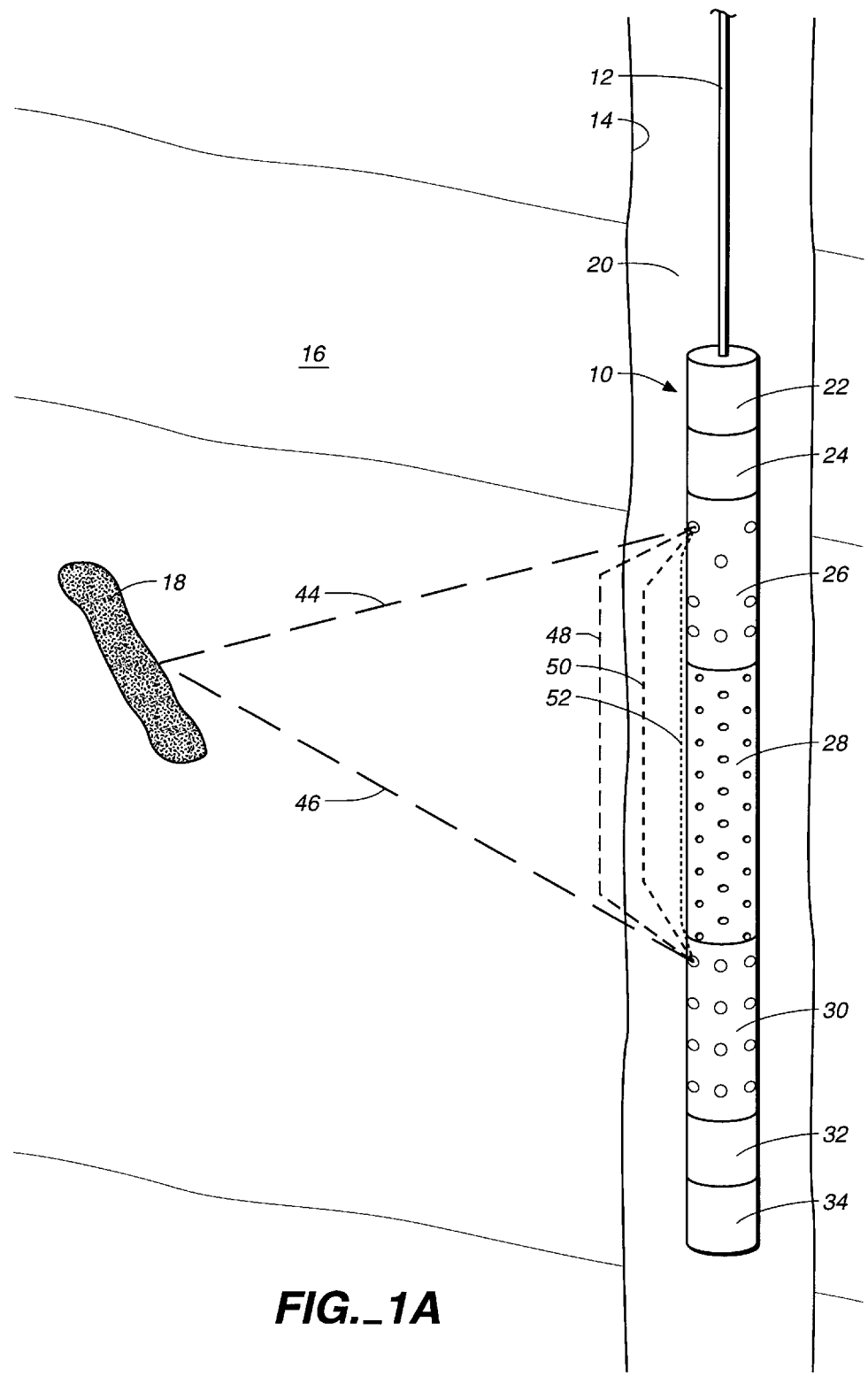
FIG._1A

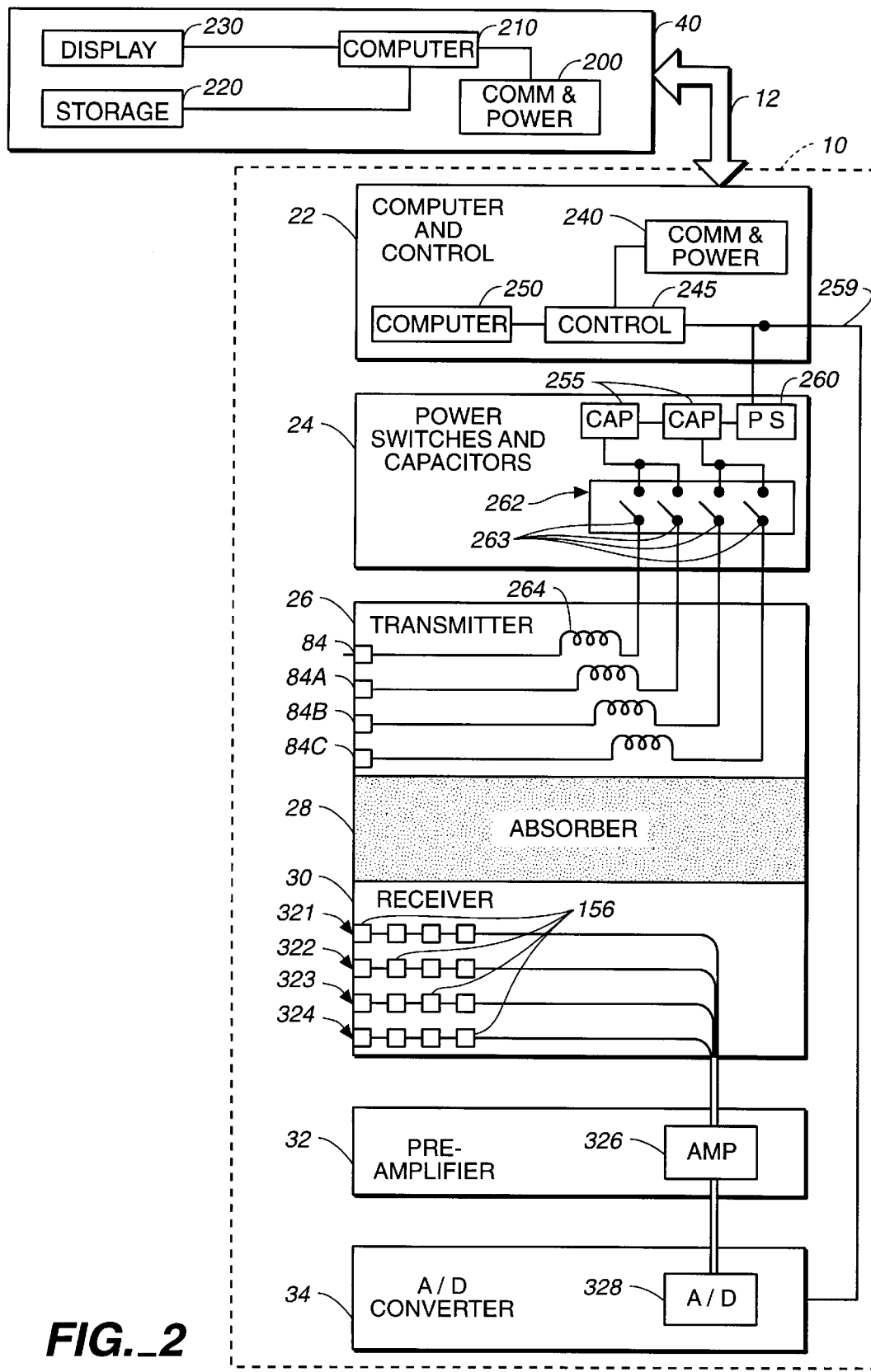
FIG._2

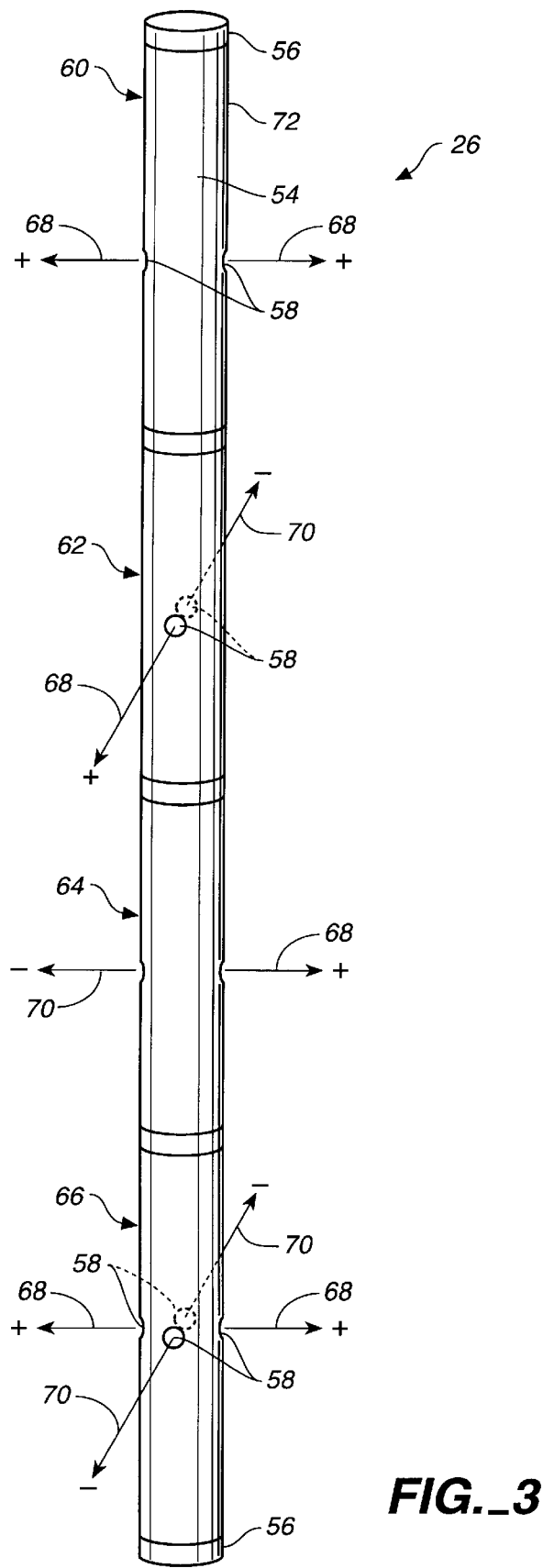
FIG._3

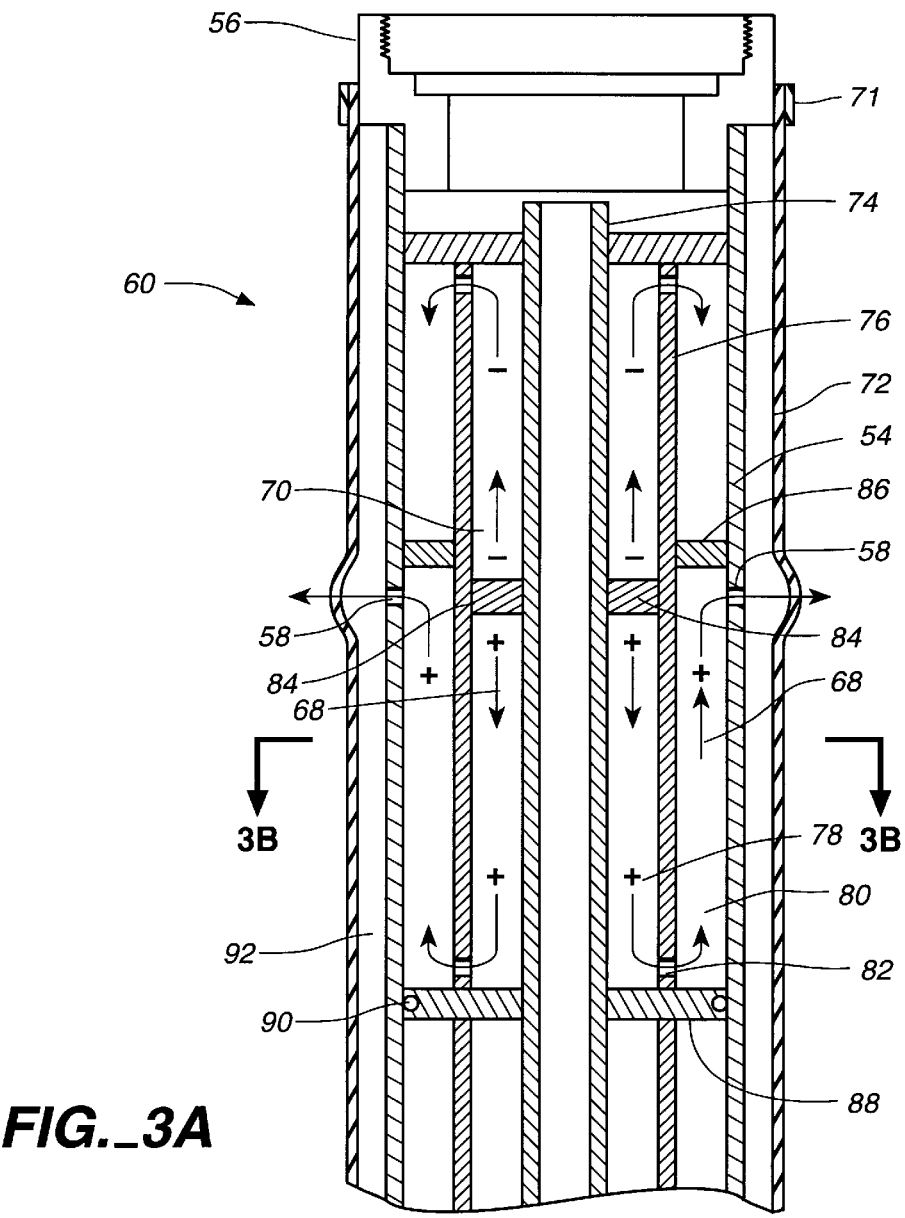
FIG._3A
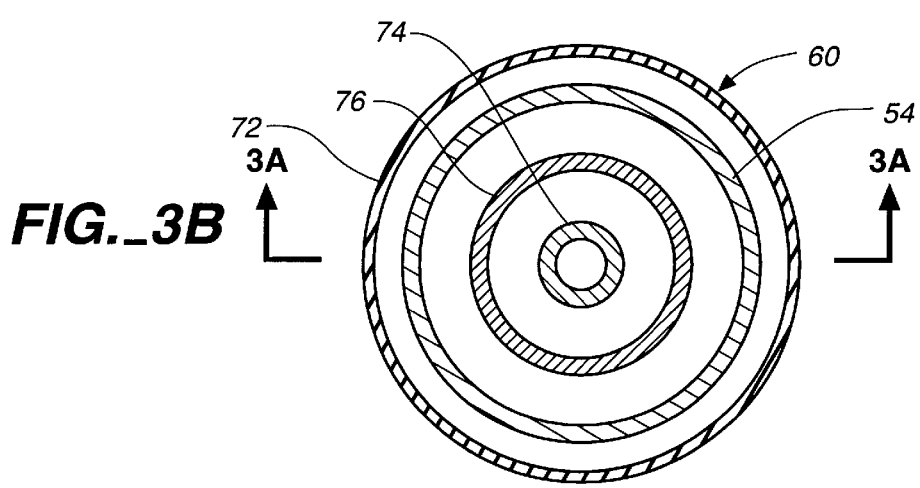
FIG._3B

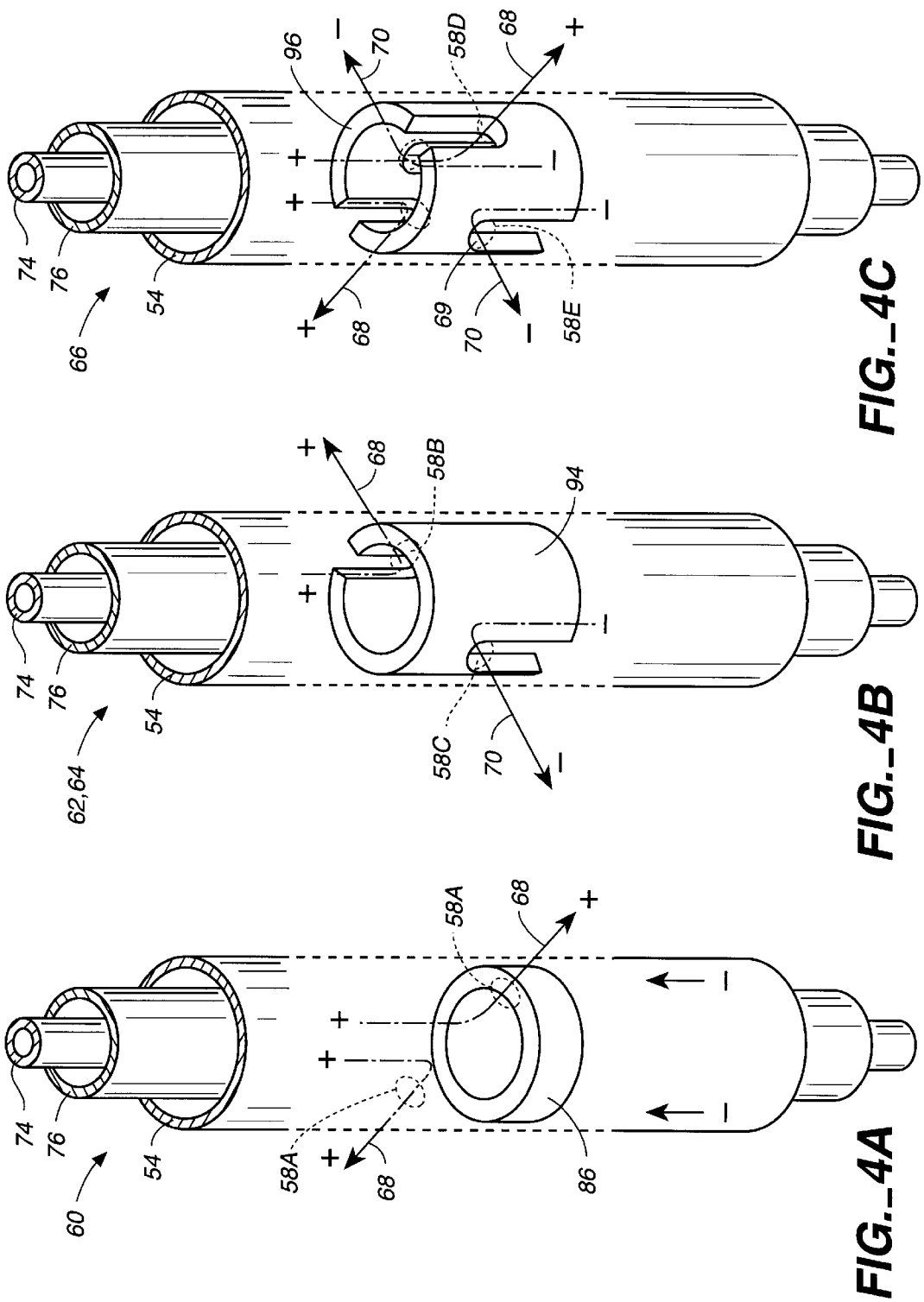

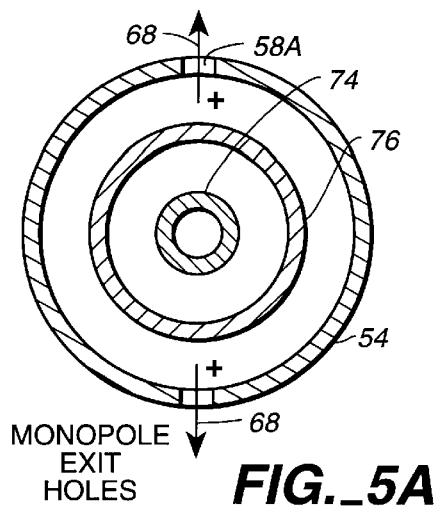
MONOPOLE EXIT HOLES  FIG._5A
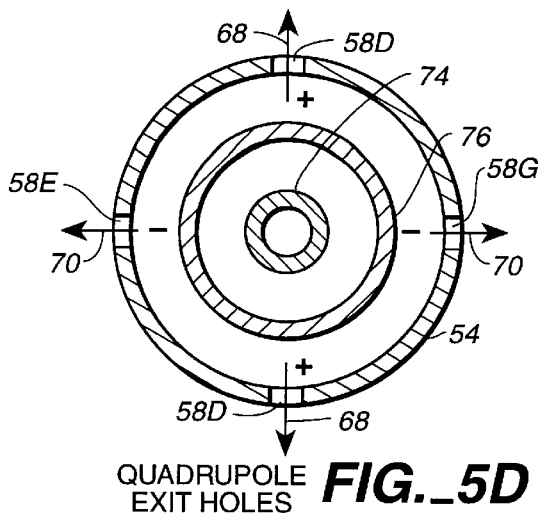
QUADRUPOLE EXIT HOLES  FIG._5D
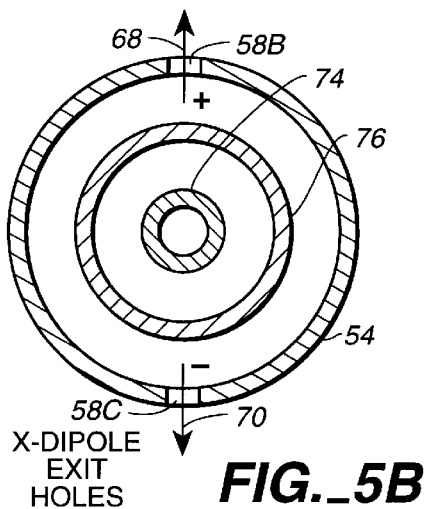
X-DIPOLE EXIT HOLES  FIG._5B
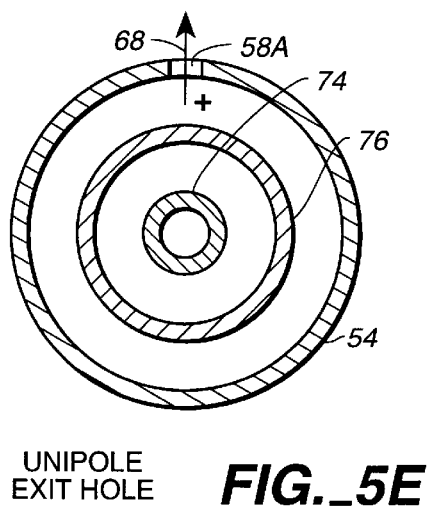
UNIPOLE EXIT HOLE  FIG._5E
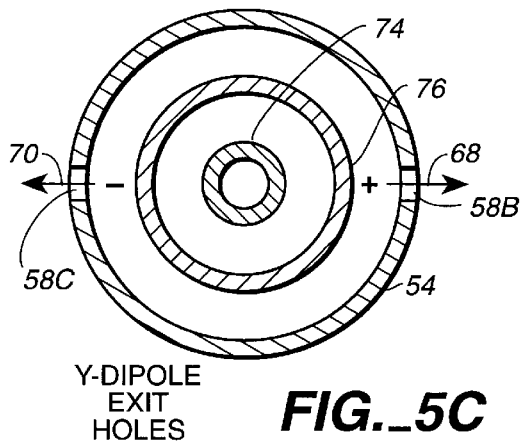
Y-DIPOLE EXIT HOLES  FIG._5C

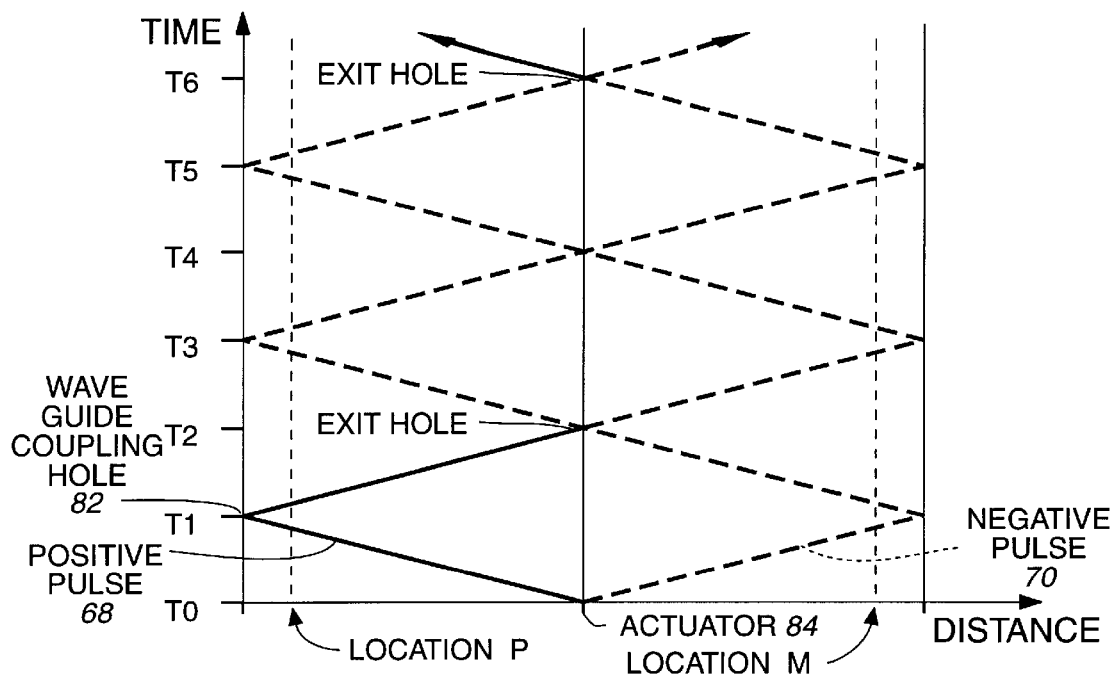
FIG._6A
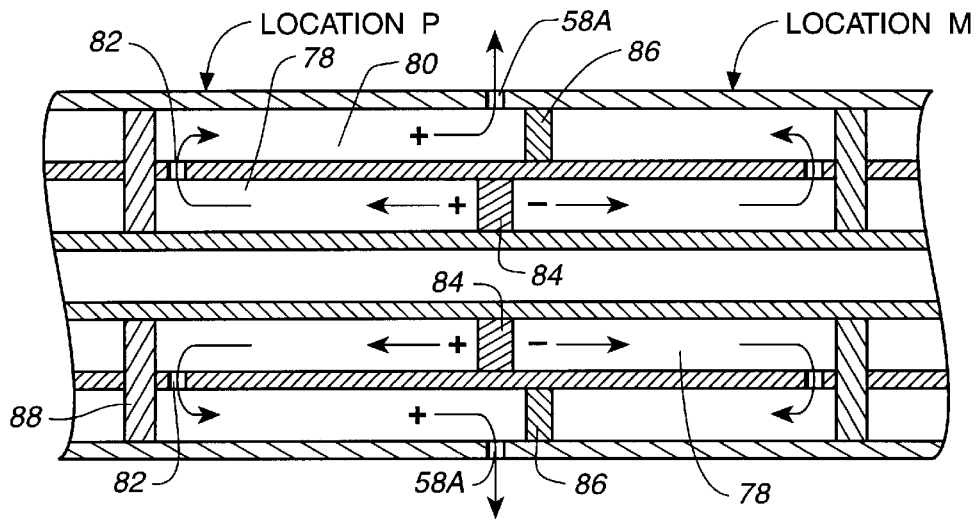
FIG._6B

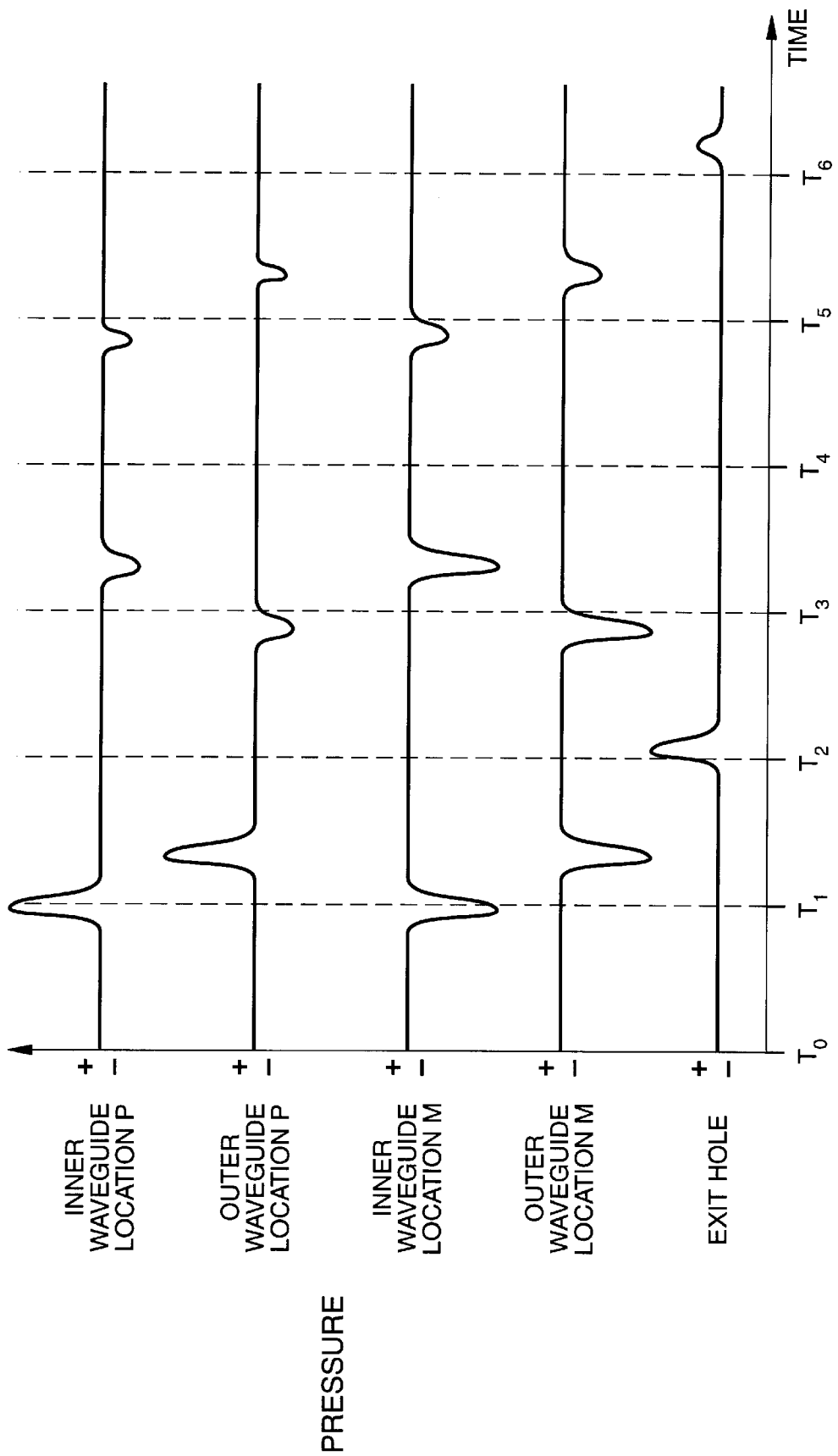
FIG._6C

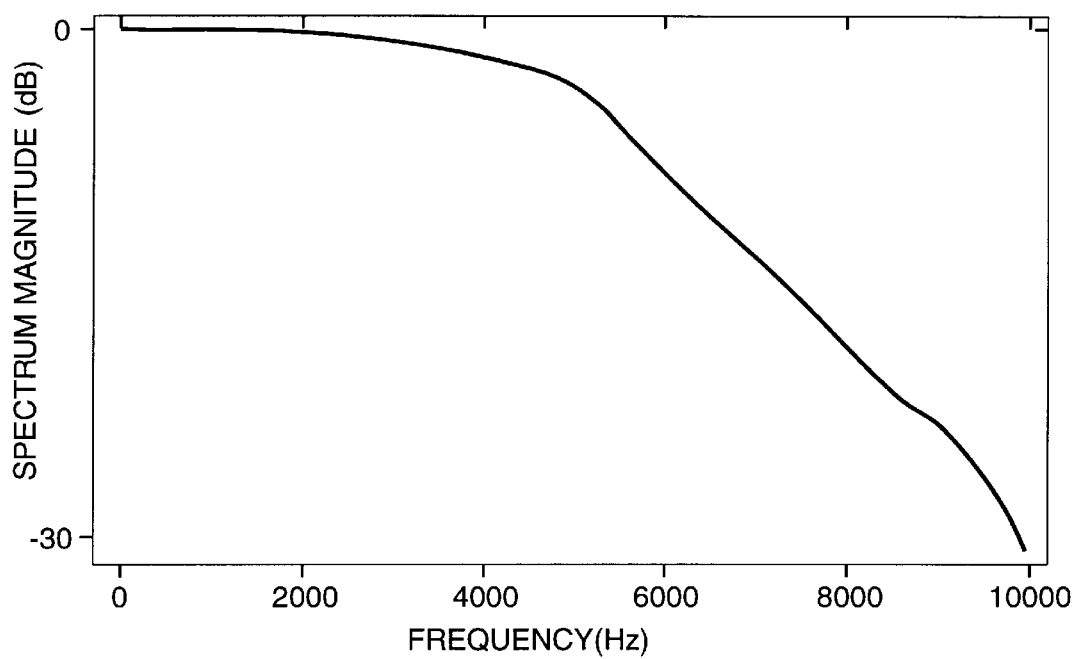
FIG._6D

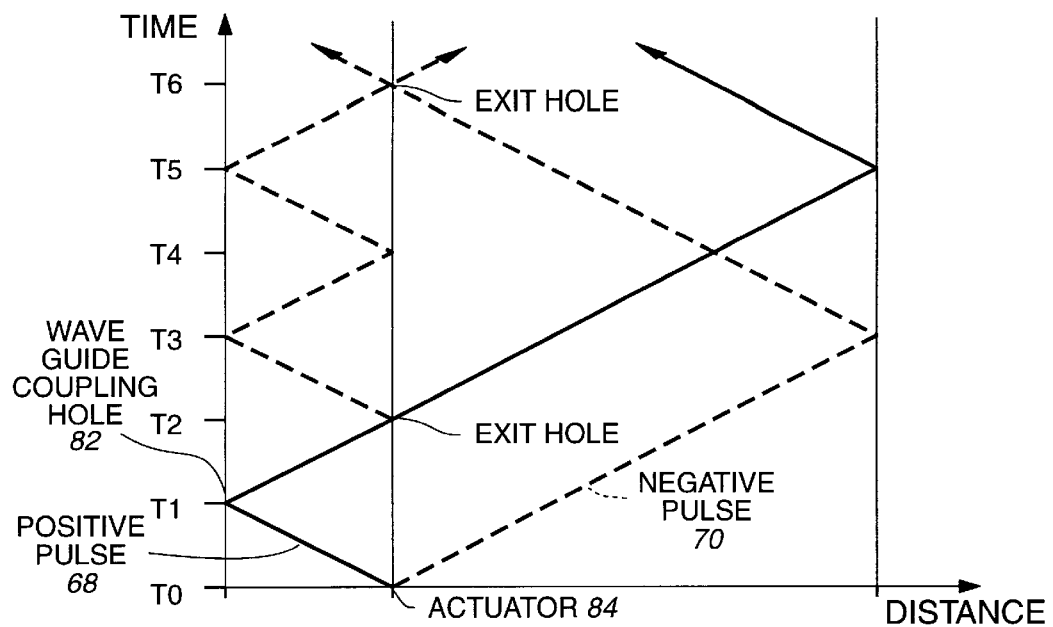
FIG._7A
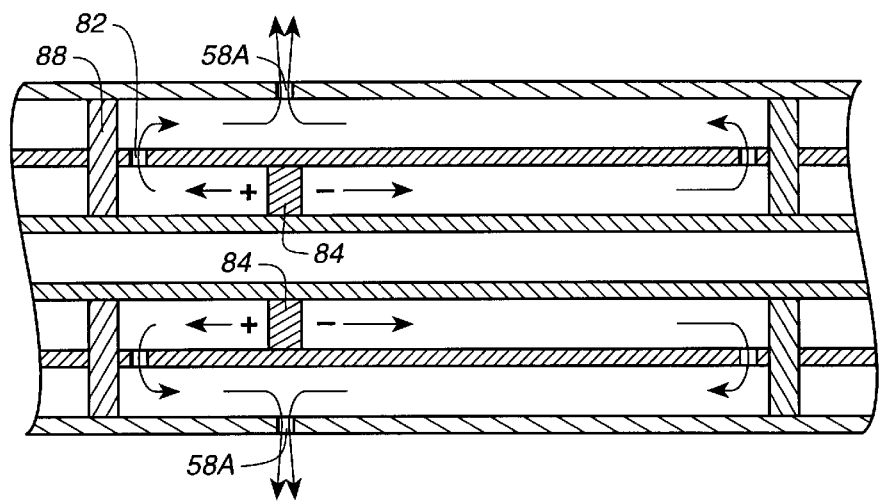
FIG._7B

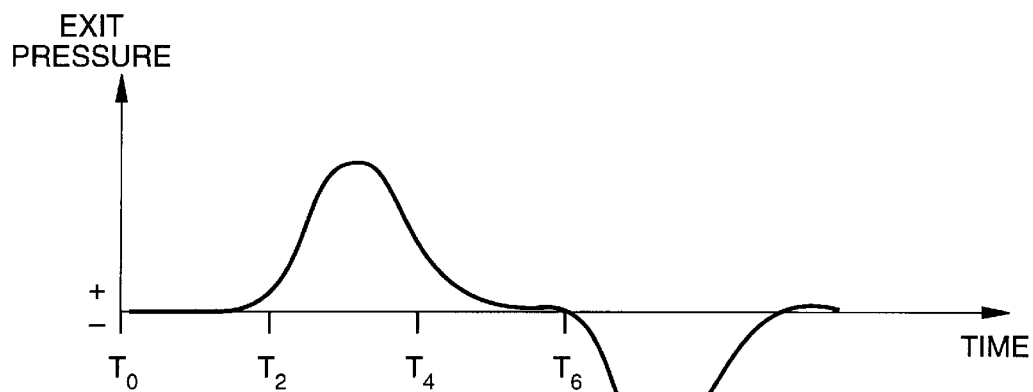
FIG._7C
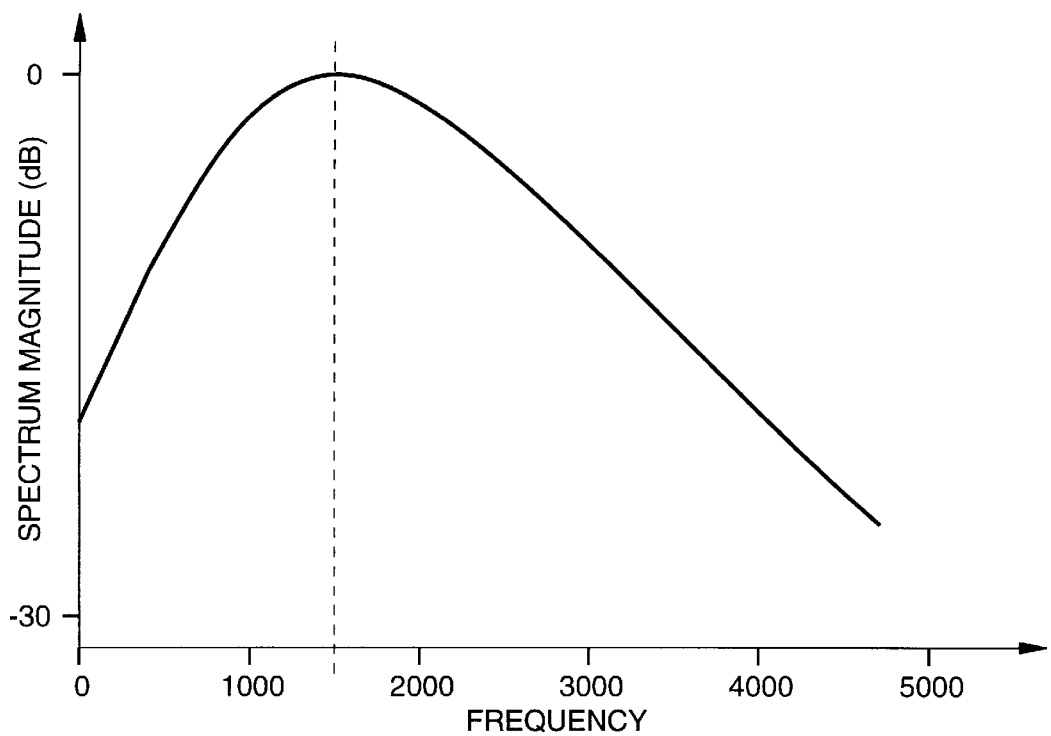
FIG._7D

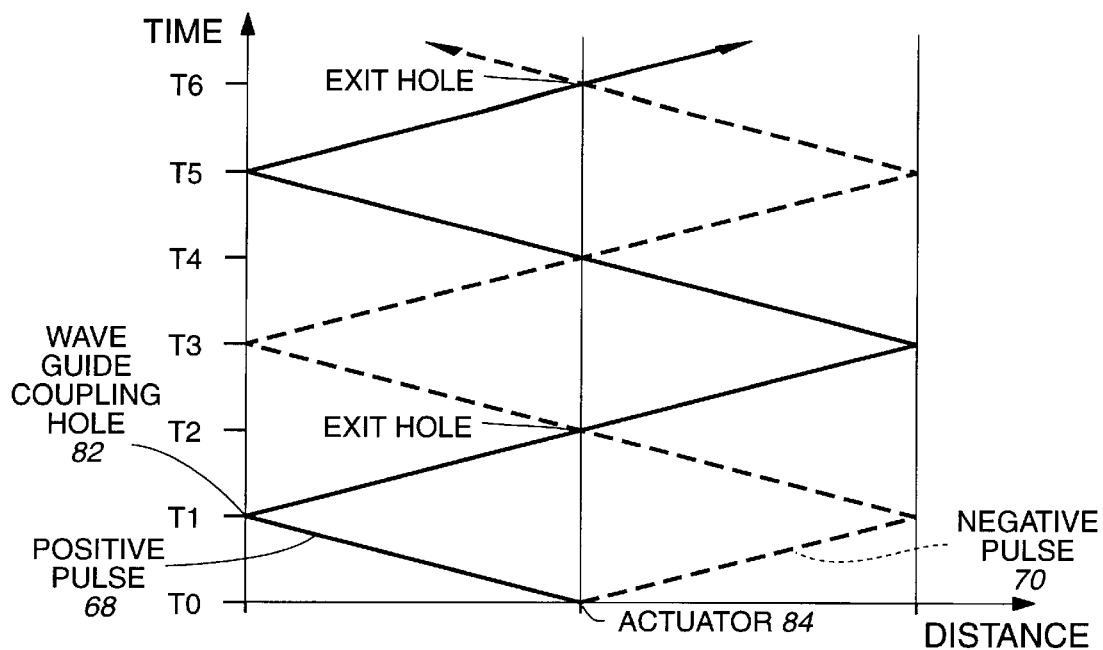
FIG._8A
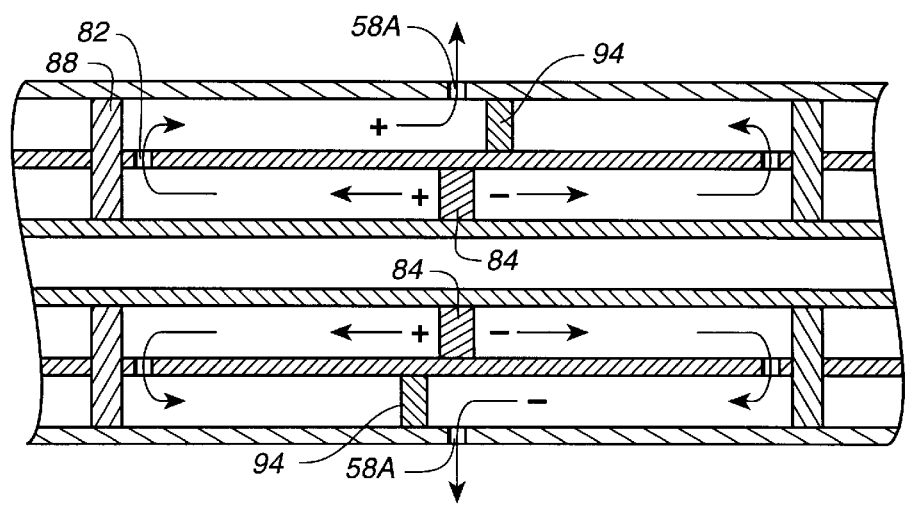
FIG._8B

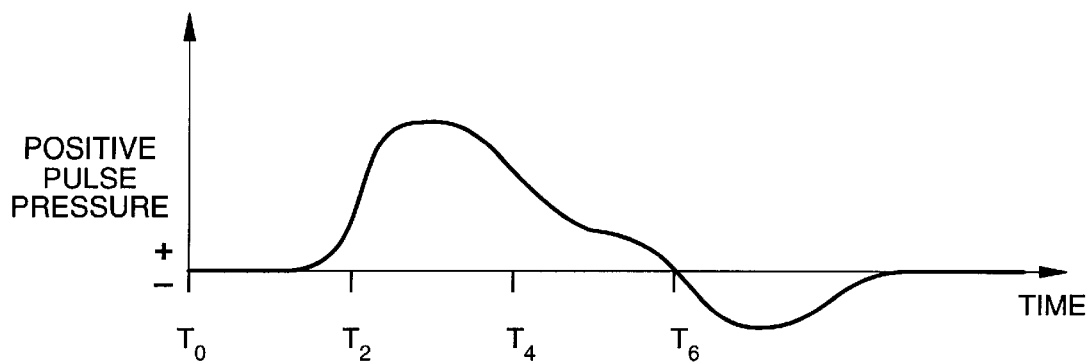
FIG._8C
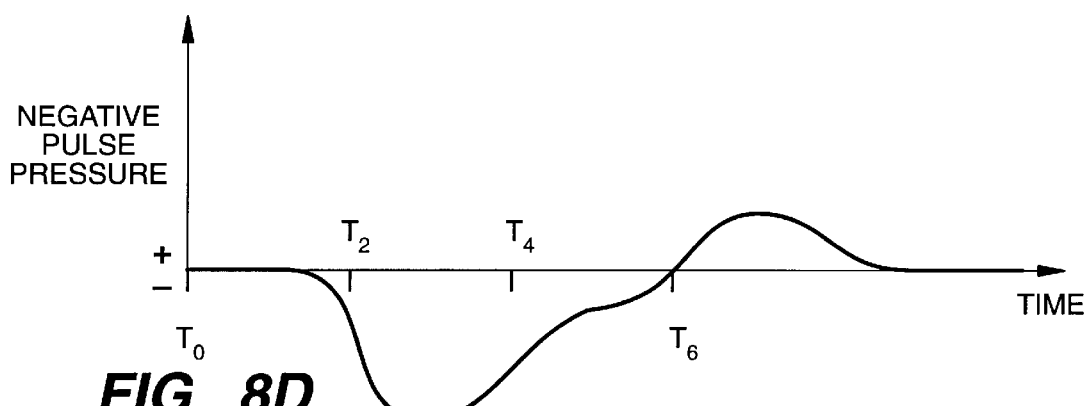
FIG._8D
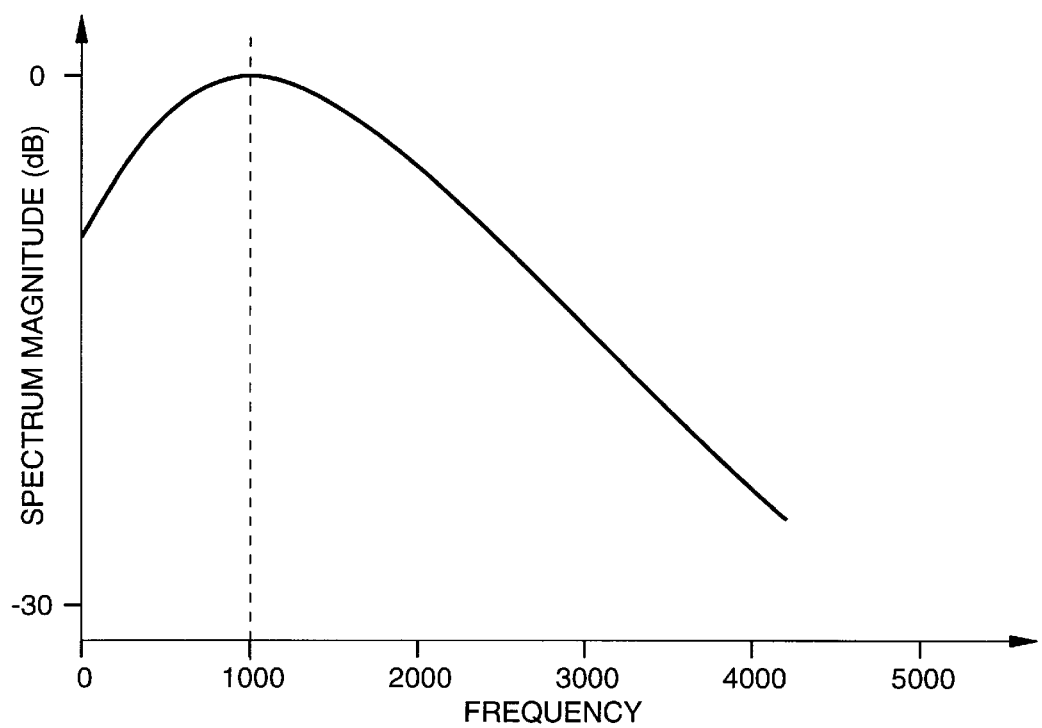
FIG._8E

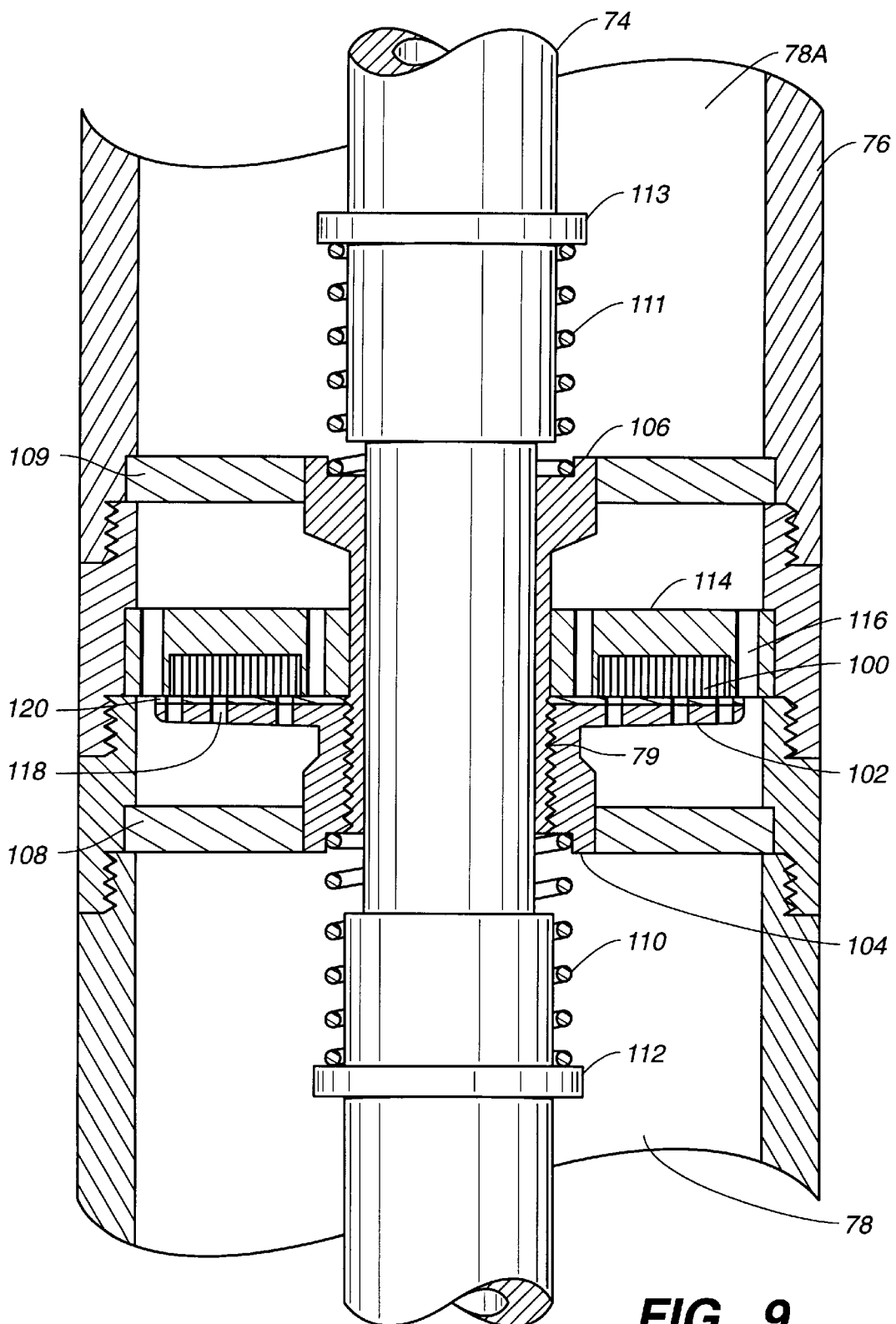
FIG._9

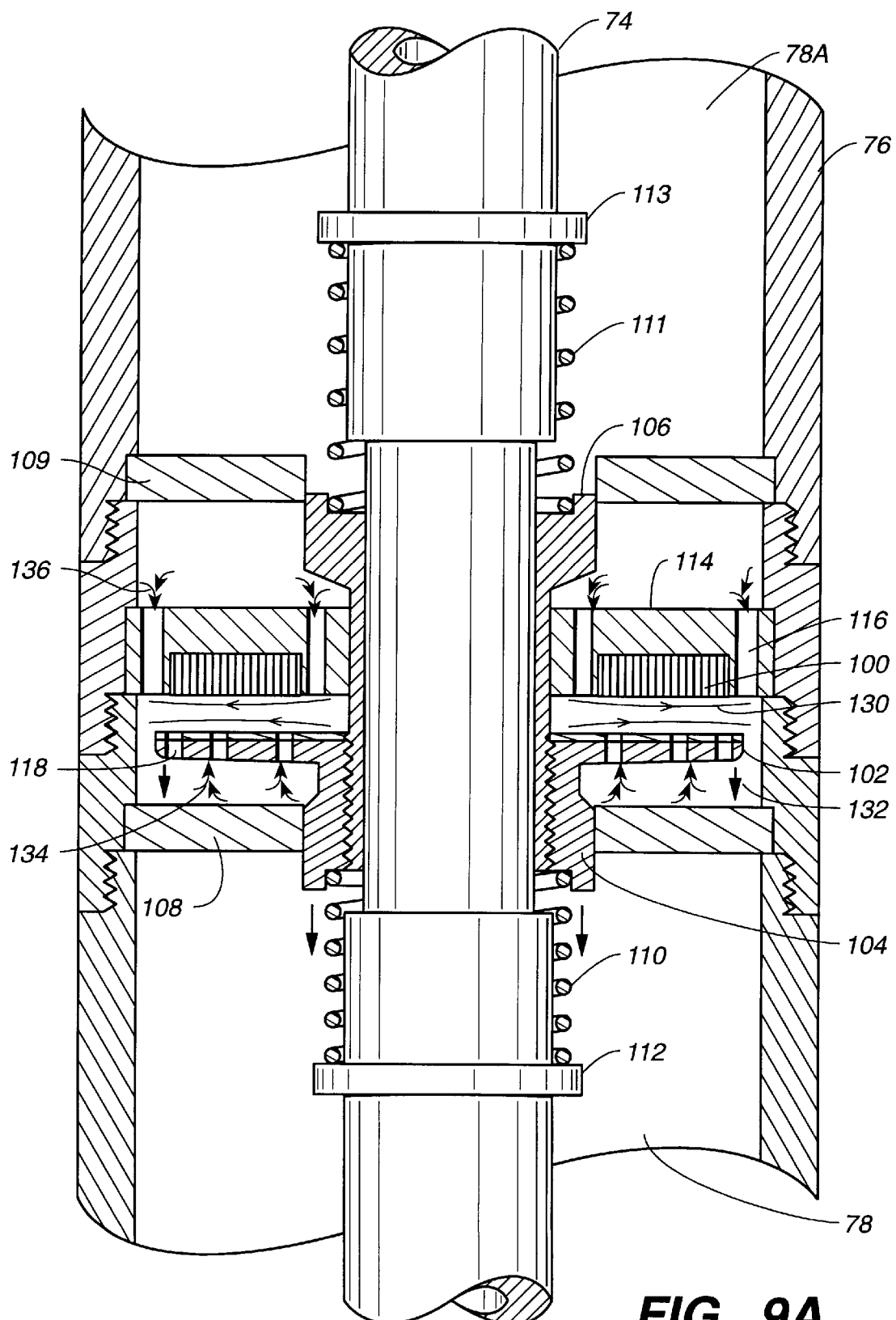
FIG._9A

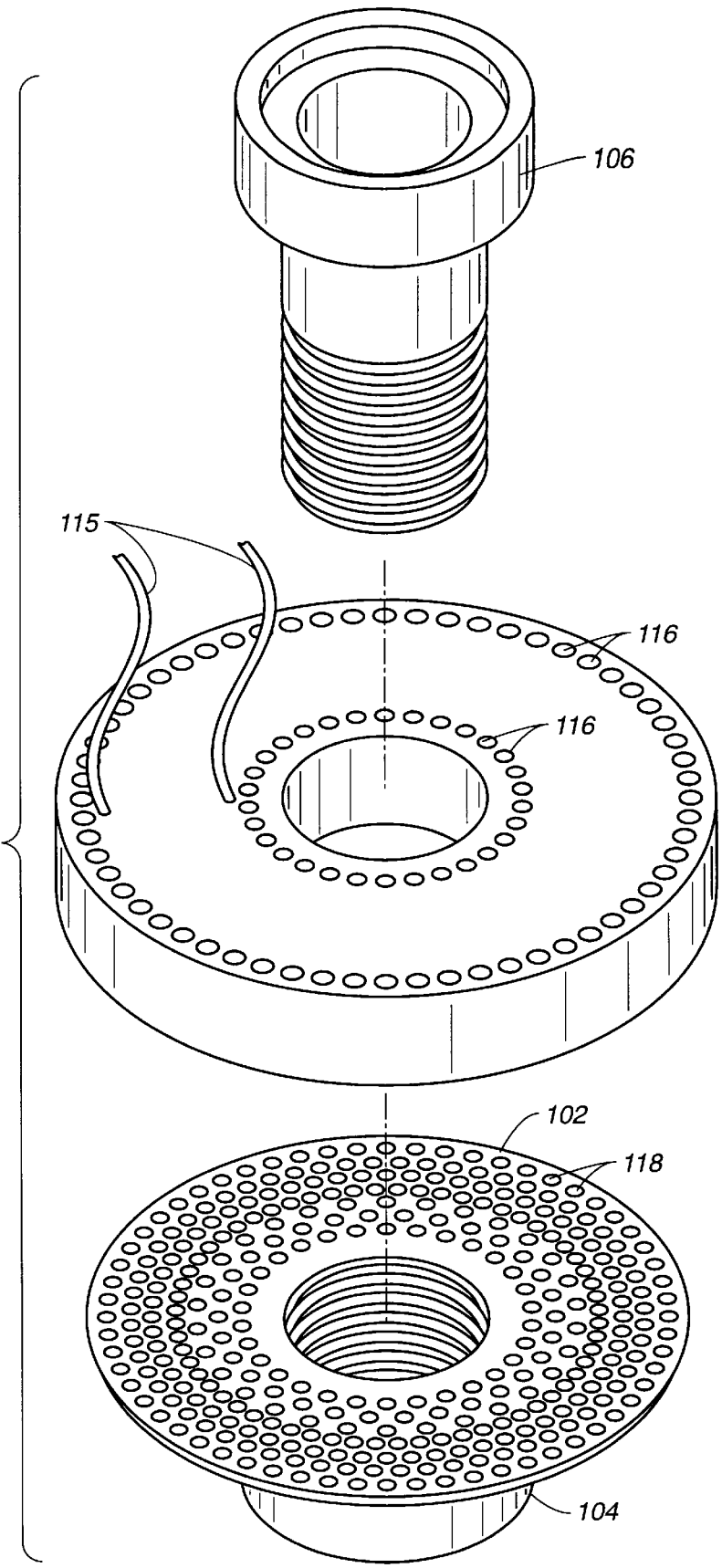
FIG._10

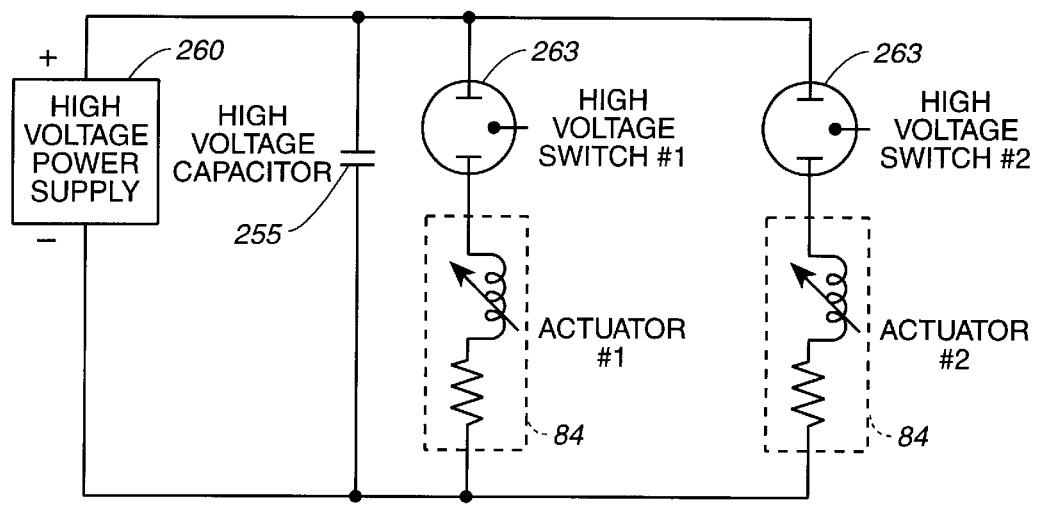
FIG._11A
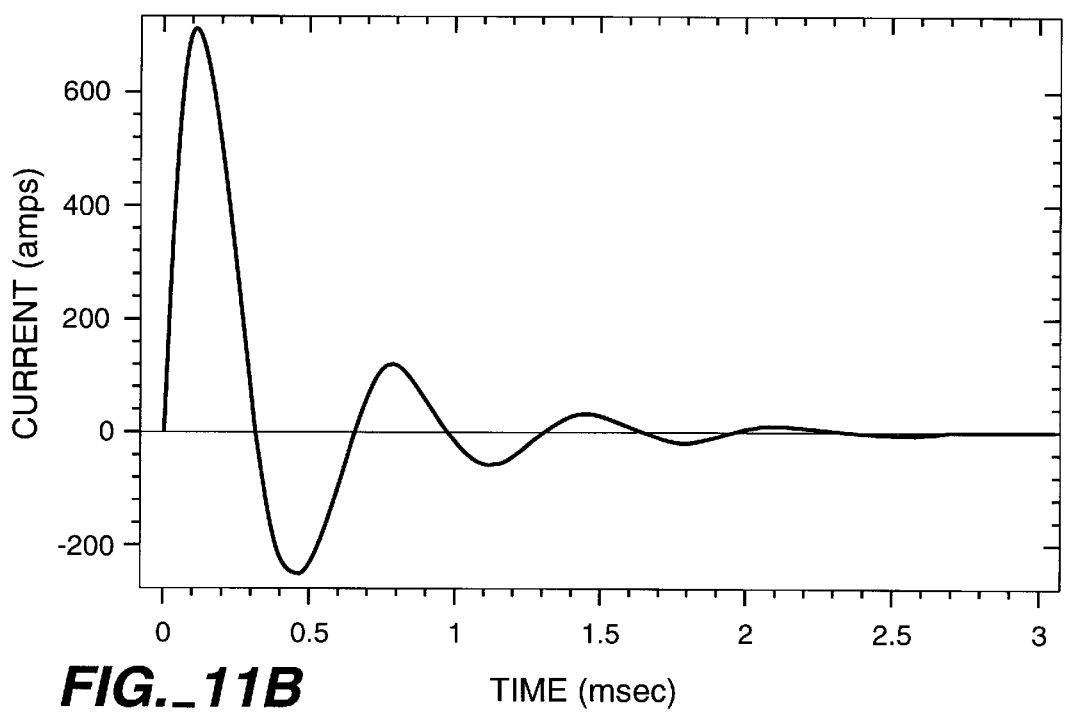
FIG._11B

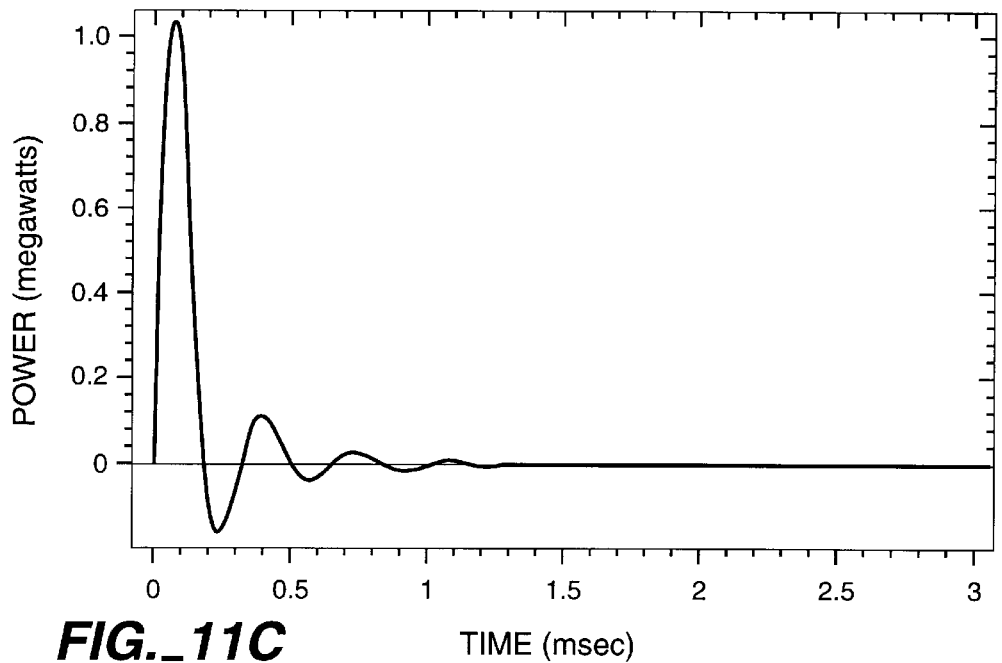
FIG._11C
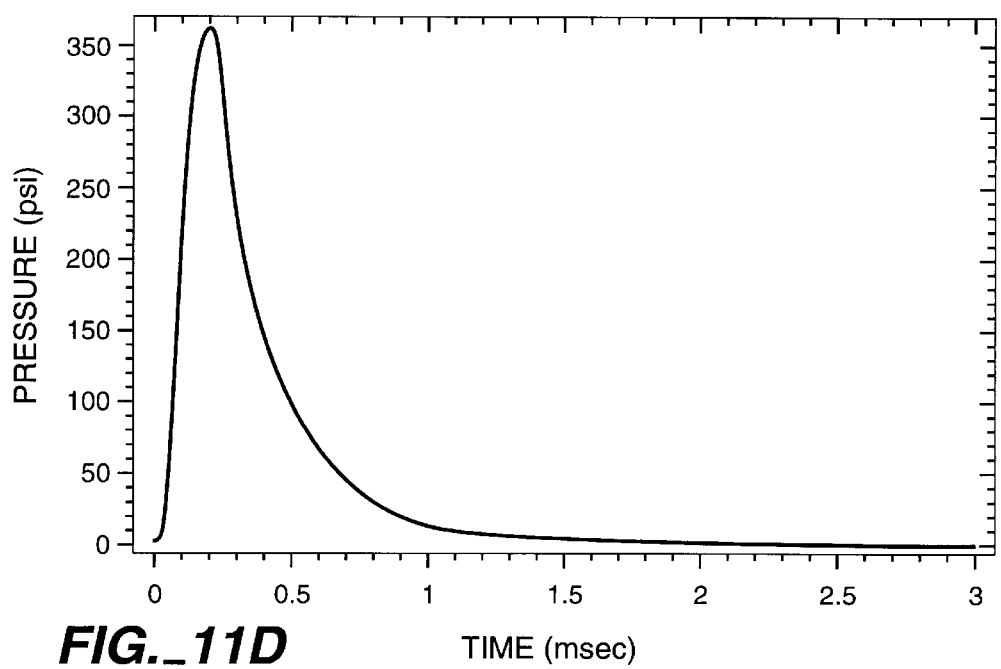
FIG._11D

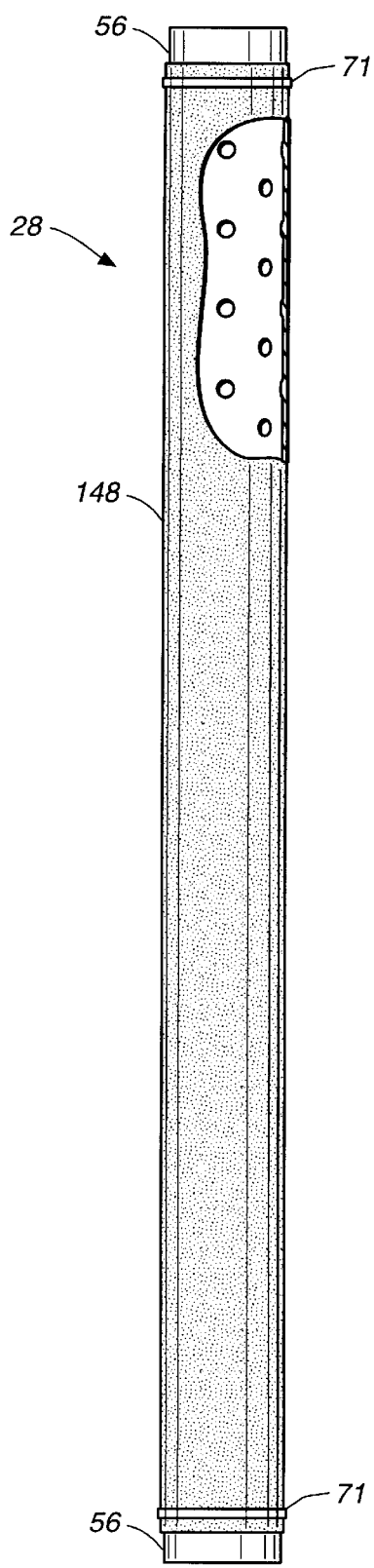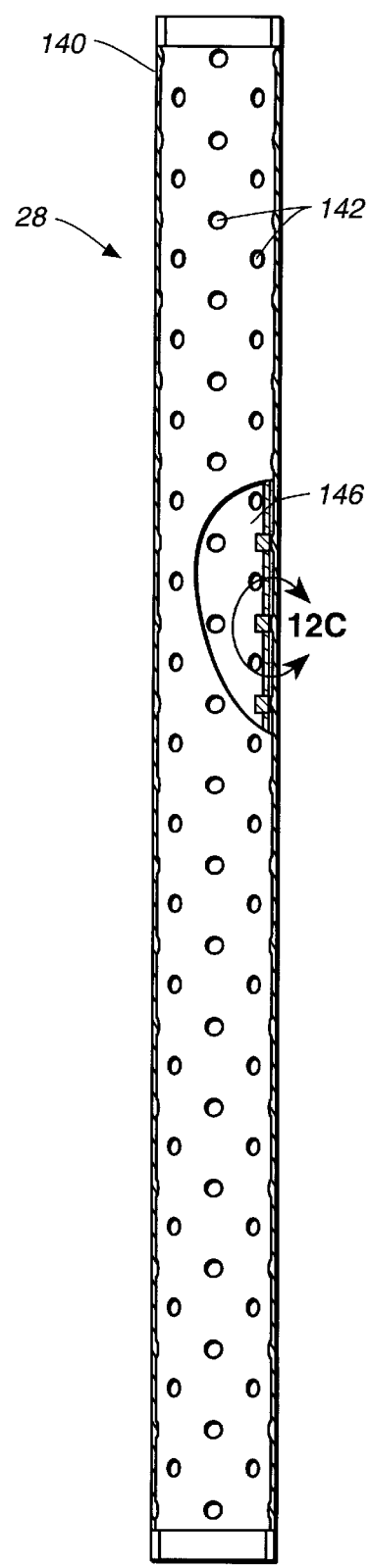
FIG._12A  FIG._12B

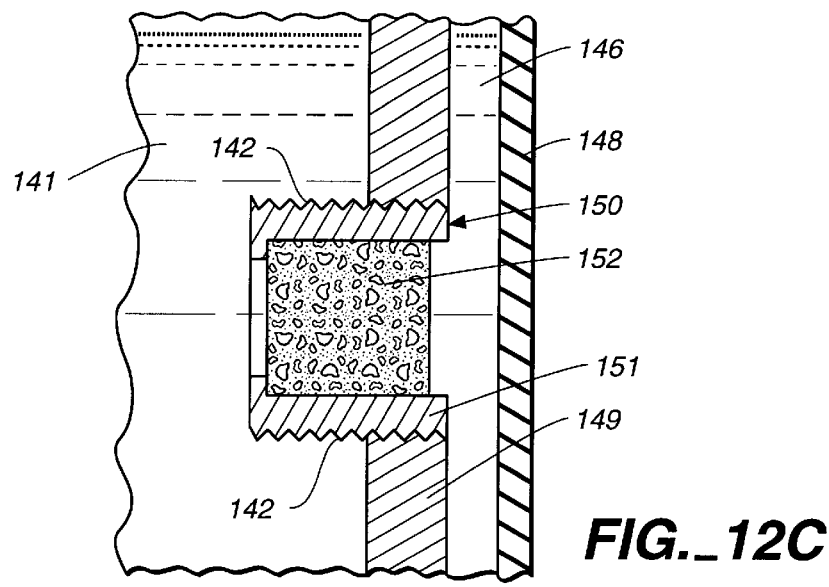
FIG._12C
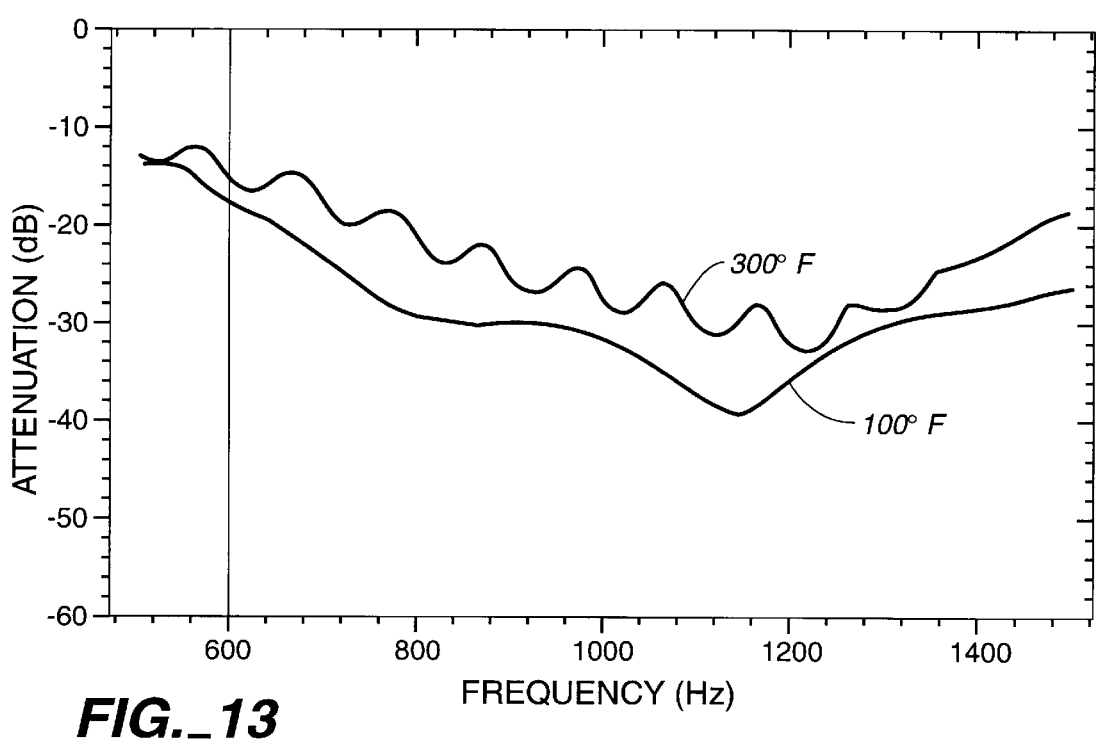
FIG._13

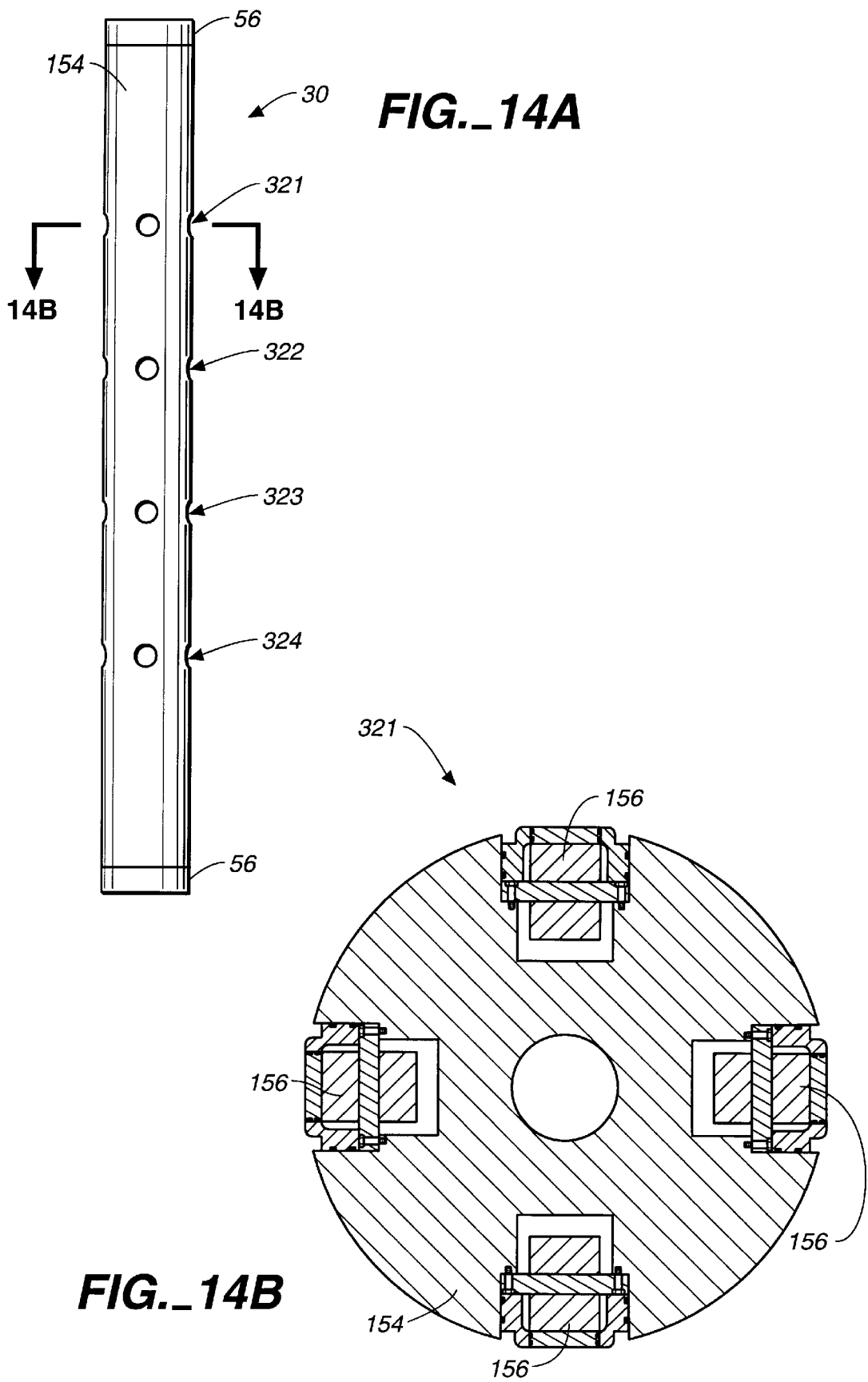

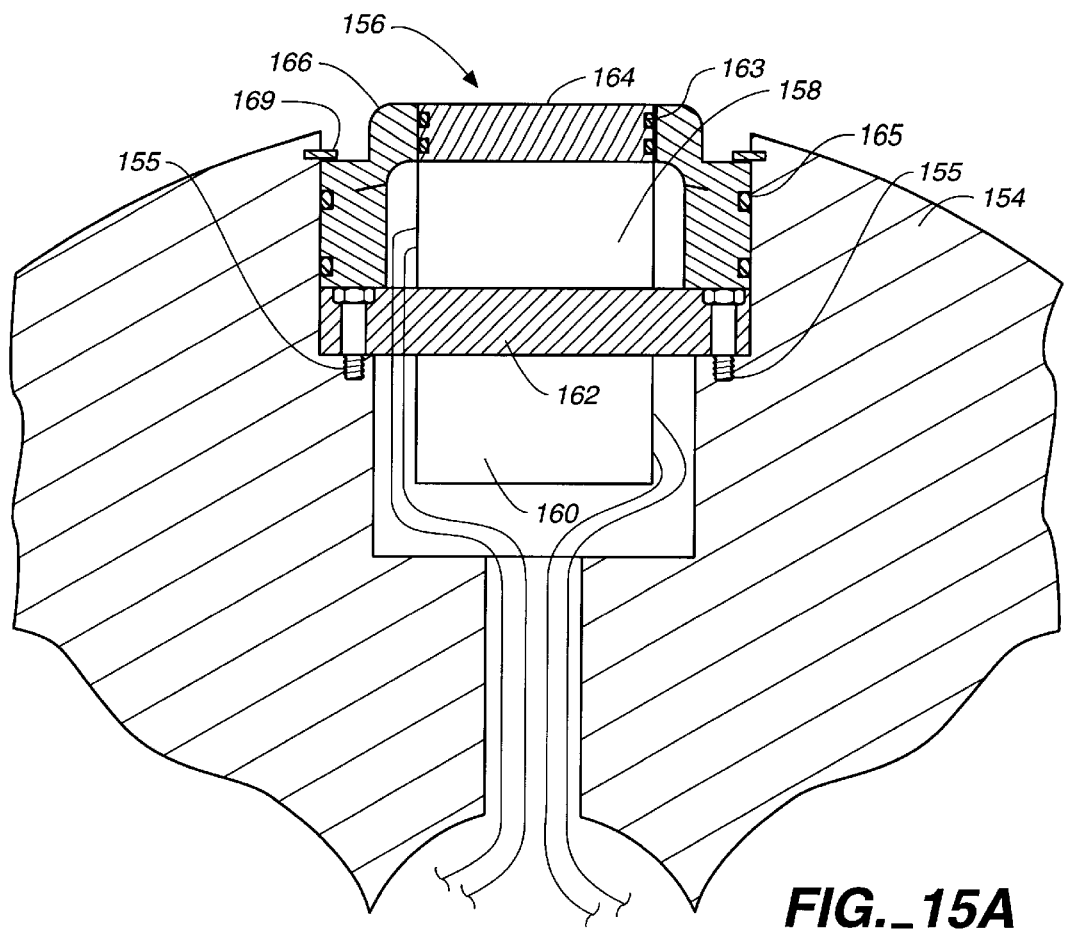
FIG._15A
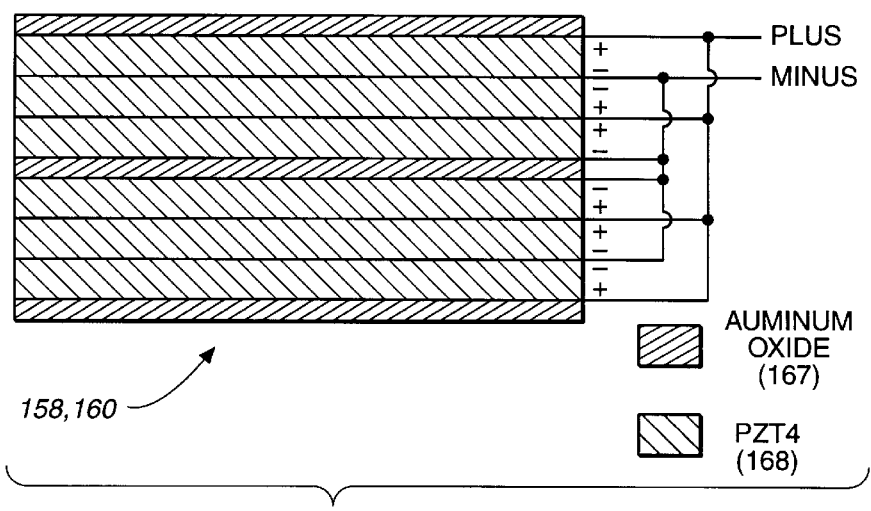
FIG._15B

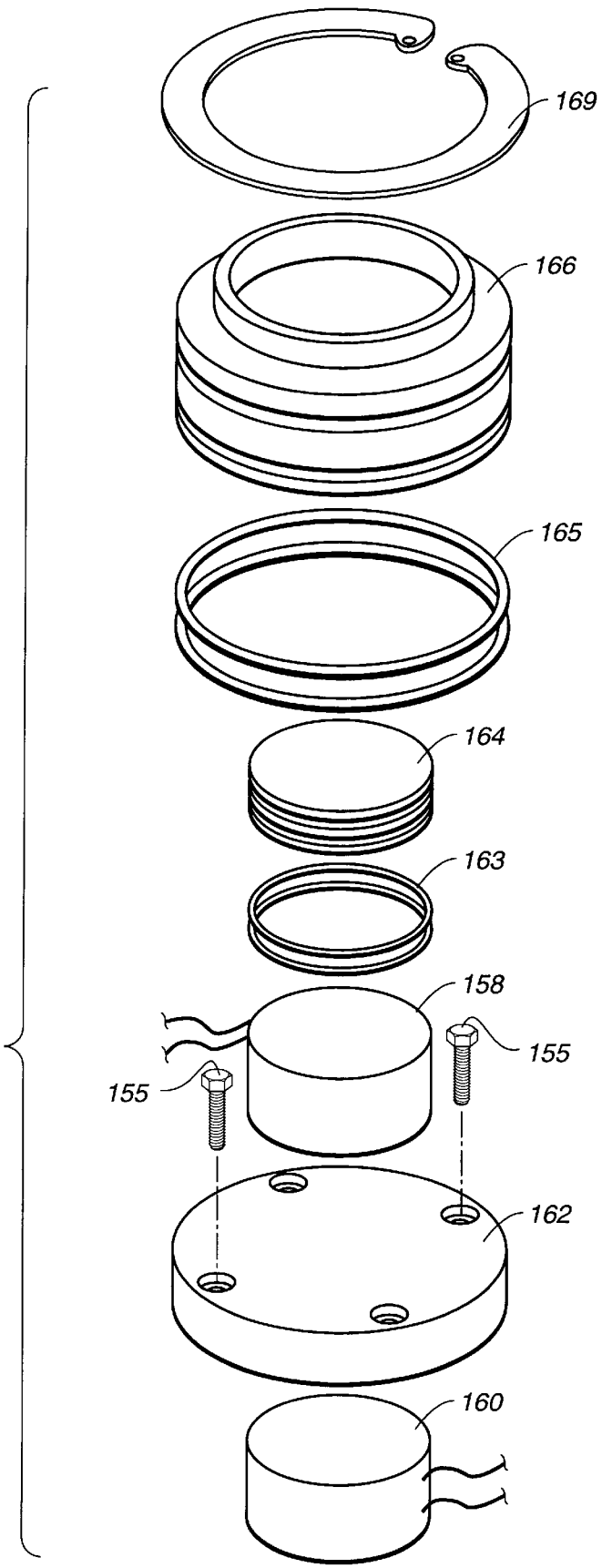
FIG._15C

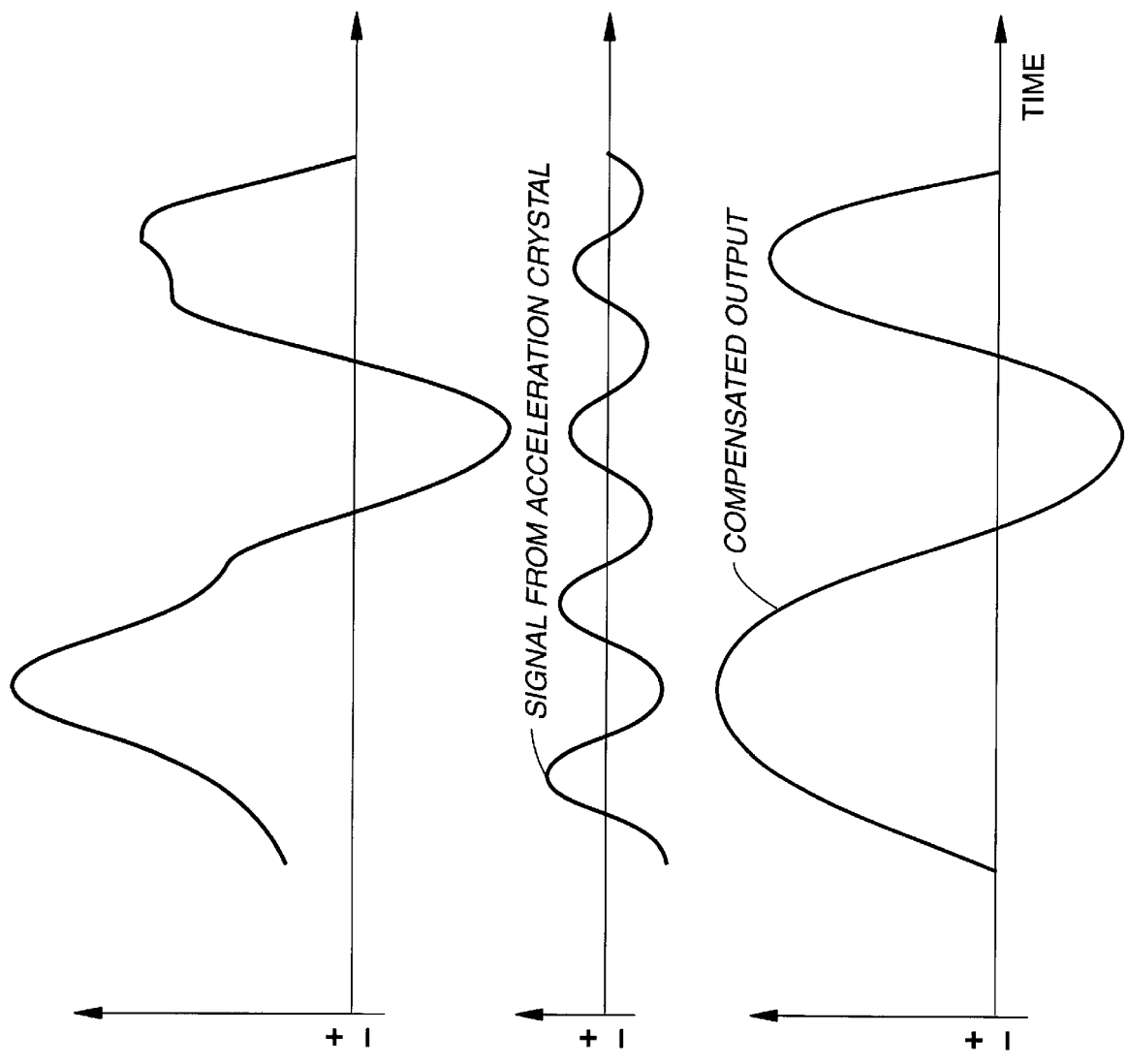

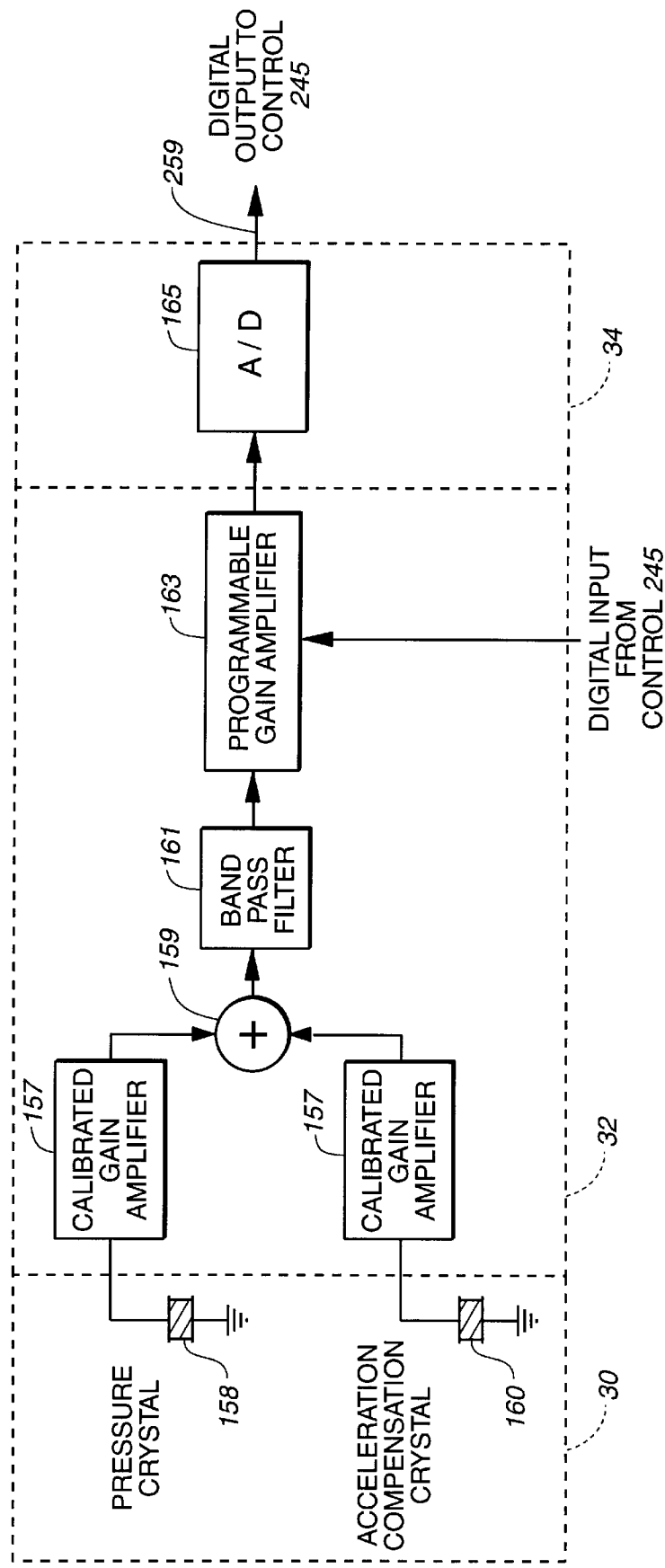
FIG._17

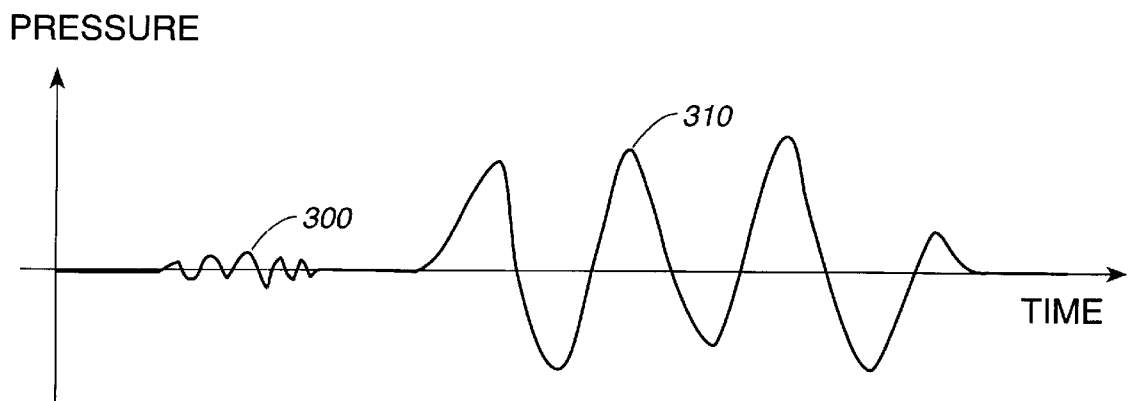
FIG._18A
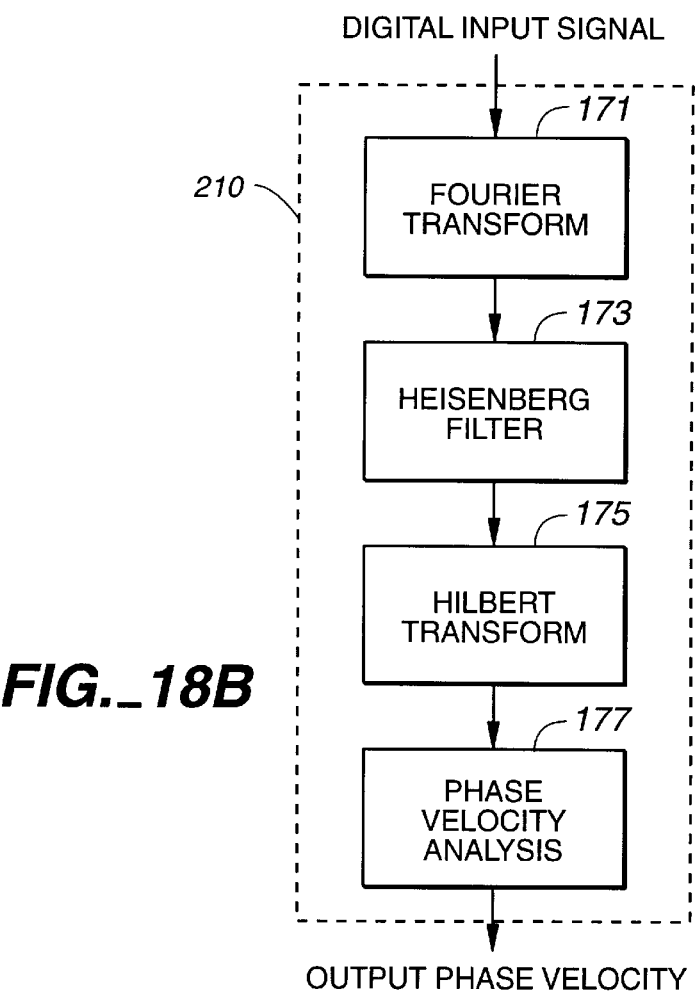
FIG._18B

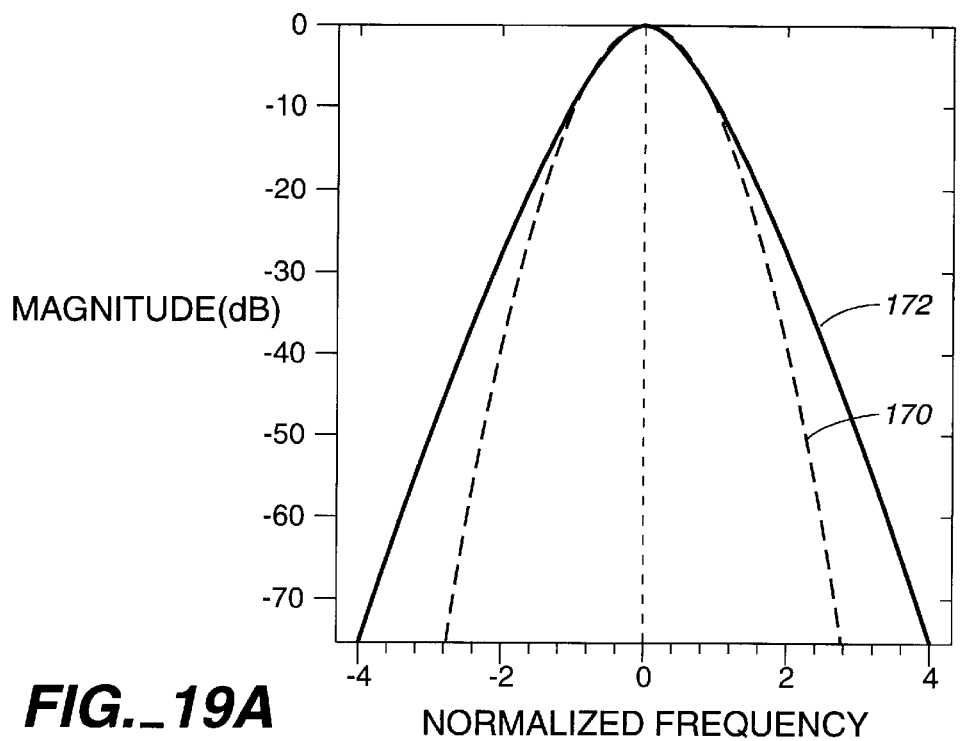
FIG._19A
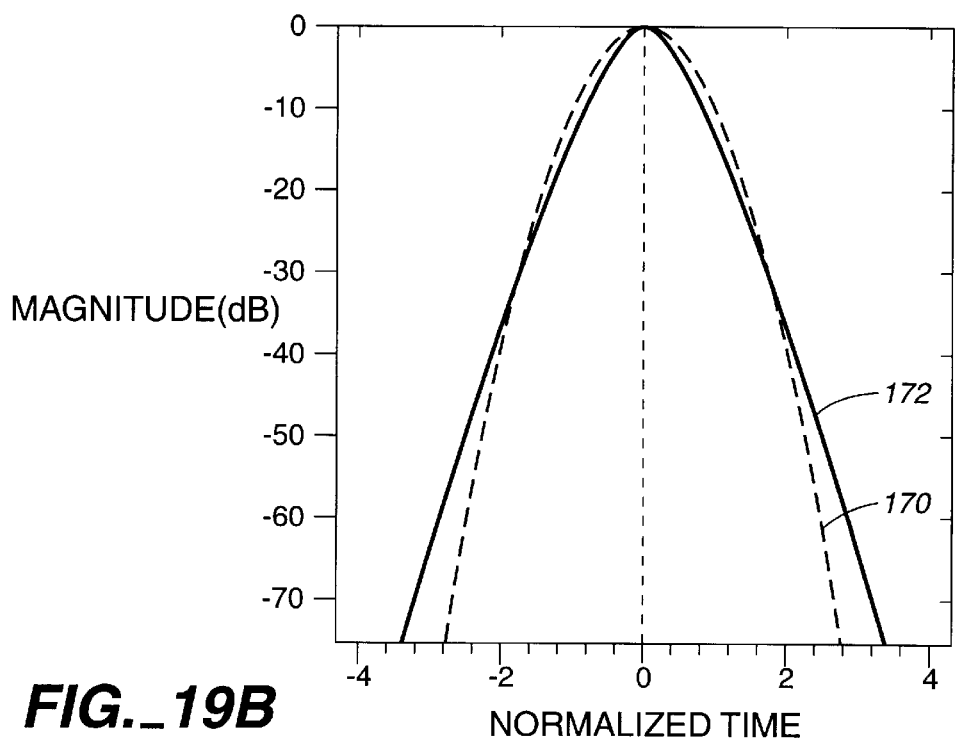
FIG._19B

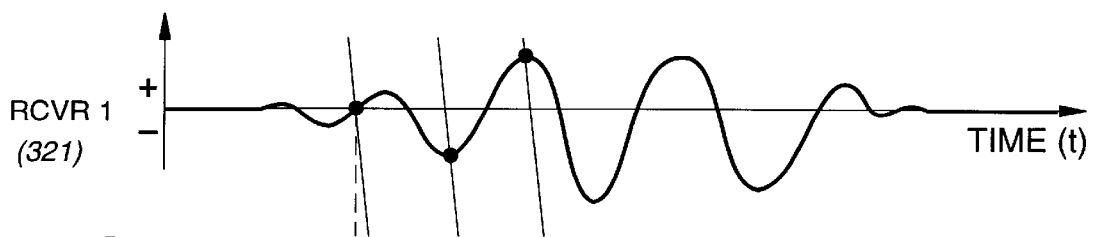
FIG._20A
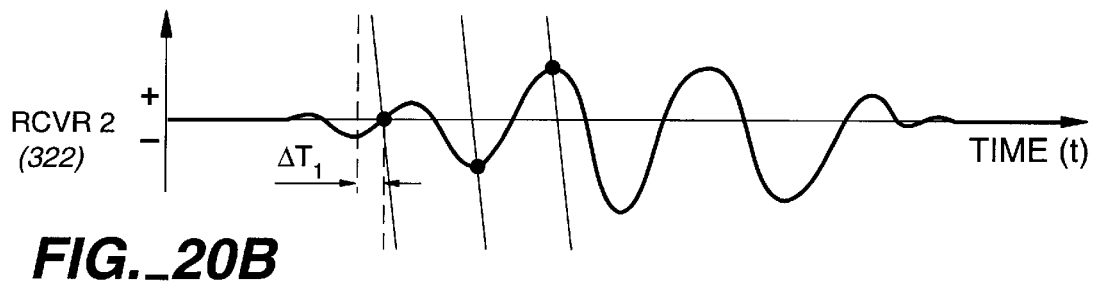
FIG._20B
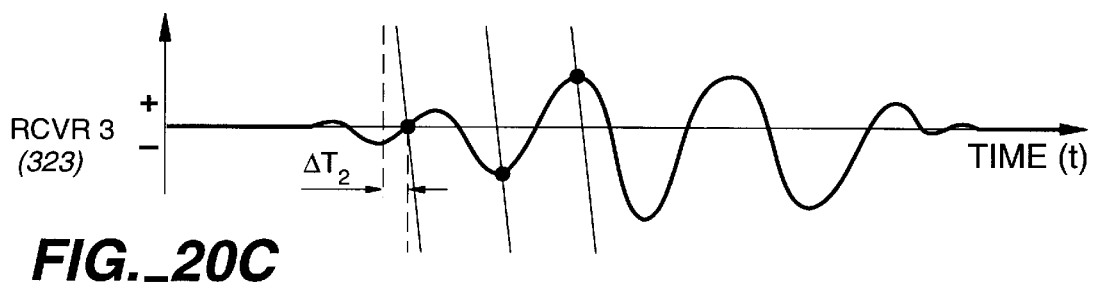
FIG._20C
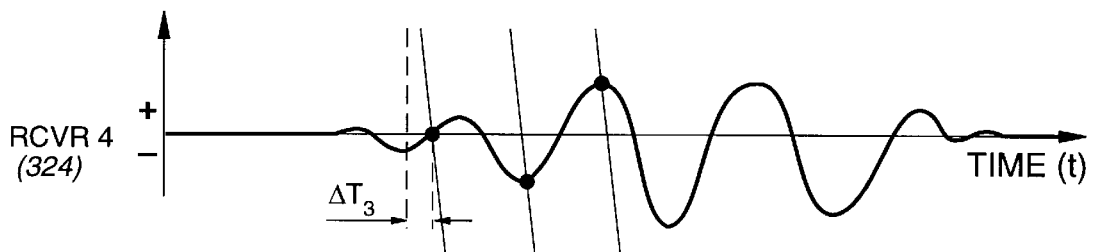
FIG._20D

SIGNAL PROCESSING METHOD FOR IMPROVED ACOUSTIC FORMATION LOGGING SYSTEM

This application is a division of application Ser. No. 08/535,968 filed Sep. 28, 1995 now allowed.

FIELD OF INVENTION

This invention relates to the field of acoustic well logging. More particularly, this invention relates to an improved method and apparatus for continuously obtaining acoustic transmission and reflection data from earth formations surrounding a well borehole. It also relates to an improved acoustic transmitter, an acoustic receiver, an absorber for reducing the effects of noise or extraneous waves and a method of data analysis, all of which are components of an improved acoustic logging system.

BACKGROUND OF THE INVENTION

In acoustic well logging, acoustic waves emitted from an acoustic source propagate through earth formations surrounding the well, and are received by an array of transducers spaced a distance away from the source. Measurements of acoustic wave arrival times and propagation velocities provide an important source of quantitative information for locating hydrocarbon bearing reservoirs and assessing their economic value.

In elastic earth formations, such as porous sandstone containing water or hydrocarbons in the pore space, the acoustic wave divides into at least two components traveling at different acoustic velocities. A compressional wave, also known as a primary or P-wave, is commonly the fastest acoustic wave and appears at the receiver before the other waves. This wave arises from compression of the formation, and is related to the compressibility properties of both the mineral content of a porous formation and the compressibility properties of fluid contained in the pores. A shear wave or S-wave typically follows the arrival of the P-wave. It arises from transverse shear motion of the formation, and is affected primarily by the shear stiffness of the mineral components of a porous formation. In formations with substantial anisotropy, the shear wave may be further subdivided into two components traveling at different velocities; a component polarized in one direction (called the x-shear wave), and another component polarized in a perpendicular direction (called the y-shear wave).

Measurement of wave velocities of formation materials surrounding the borehole provides important quantitative information about both mineral matrix and pore fluids. In particular, a combination of compressional and shear velocities allows the location, identification, and economic value assessment of hydrocarbons, including both oil and gas. Measurement of wave velocities between separate boreholes provide information about geologic structures between the boreholes, and provides useful information for identifying bypassed oil pockets and monitoring the effectiveness of oil field production. Furthermore, measurement of arrival times from reflected waves provides important information about the location and properties of geological structures, such as hydrocarbon-bearing zones, at a distance away from the borehole.

Additional undesirable acoustic waves called tube waves are commonly produced when an acoustic source is located in a borehole containing fluid such as drilling mud or water. The tube wave, sometimes also called a Stoneley wave, is a low frequency (less than 10 kHz) compressional wave which is propagated in the borehole fluid but whose velocity may be modified by the properties of the surrounding formation. At high frequencies (greater than 10 kHz), there are in general a multiplicity of complicated waves traveling through the borehole fluid at different velocities. These additional waves represent undesirable noise which obstructs the measurement of shear wave and compressional wave velocities.

Many tools have been developed for acoustically logging a wellbore to obtain wave velocity data. A typical acoustic well logging tool comprises a sonde containing an acoustic source and one or more spaced receivers together with processing means to identify a selected acoustic wave and measure its velocity. The sonde is raised and lowered in the wellbore on a wireline logging cable which provides operating power for transmitter and receivers and transmits information from the sonde to the surface. The transmitter is pulsed in a timed sequence as the sonde is raised in the wellbore to generate acoustic signals which pass into the formation and are passed back into the wellbore where they are detected by the receivers in the sonde. The detected signals are then transmitted through the cable to the surface where they are processed and recorded to produce the desired acoustic log of the wellbore.

The earliest acoustic logging tools to be commercially developed, sometimes called sonic tools, provided for measurements of compressional wave velocity in uncased wellbores located in hard rock formations. In this situation, since the compressional wave is the fastest of all wave modes, detection of a first arrival in the wave train at spaced apart receiver locations determined interval transit time (usually expressed in microseconds per foot), from which compressional wave velocity was readily obtained. Acoustic energy sources, or transmitters, used in sonic tools were originally made of magnetostrictive material, which is magnetic material that deforms in the presence of a magnetic field. Later tools used piezoelectric crystals that deformed in the presence of an electric field. Magnetostrictive or piezoelectric transmitters for sonic tools operated at the resonant frequency of the transmitter, which was typically between 10 and 30 kHz.

Sonic tools heretofore devised have been limited by a variety of factors. Perhaps most important is the restriction of the sonic log to measurements of compression wave velocity only, although it is recognized that shear wave velocity measurements contain vital information for characterizing formation properties. Furthermore, the relatively low power level of magnetostrictive or piezoelectric transmitters limited the spacing between transmitter and receiver and also restricted the sonic log to open-hole (uncased) service. Short spacing and high frequencies in prior devices caused the measurement of formation compressional waves to be representative of formation material to within only a few inches of the borehole wall.

More recently, full-wave acoustic logging tools have been developed which record acoustic pressures for an extended period of time after first arrival of a return signal at the tool receiver section. It was anticipated that analysis of the recorded wave would detect arrival of the shear wave and provide valuable data on shear wave velocity. However the presence of tube waves which travel through the mud around the tool and also tool vibrational waves which travel through the tool body have seriously obstructed the accurate determination of arrival time and propagation velocity of the shear wave.

In order to compensate for interference of undesirable waves new analysis methods were developed which estimated shear propagation velocity using acoustic pressures for an extended period of time after first arrival. However, these analysis methods did not provide an exact measurement of phase velocity, which is the desired true propagation velocity of the formation material.

DESCRIPTION OF PRIOR ART

In the prior art, attempts have been made to provide an effective full-wave acoustic tool. Kitsunezaki, in U.S. Pat. No. 4,207,961, teaches a means for preferentially exciting shear waves, thereby improving the probability of successfully identifying shear wave arrival. He noted that an acoustic source producing a net volume change in water or mud surrounding the tool is more likely to produce a P-wave and a tube wave than an S-wave, thereby obstructing measurement of the S-wave. He teaches an acoustic source which ejects water at one side of the tool while simultaneously an equivalent volume of water is sucked into the tool at the other side. Consequently, positive and negative pressure changes are indirectly applied to the two respective sides of the borehole wall, preferentially exciting a S-wave while minimizing excitation of a P-wave and a tube wave. Winbow, in U.S. Pat. Nos. 4,649,526, 4,606,04, and 4,932,003 classifies asymmetric acoustic sources in terms of equivalent multipole source polarity. A monopole source provides a positive pressure pulse symmetric on all sides of the tool. Multipole sources generate asymmetric pressure waves around the tool; a dipole source provides positive pressure at one side and an equal negative pressure at the opposite side; and a quadrupole source provides alternating positive and negative pulses at 90° intervals around the circumference of the tool. Higher multipoles, such as octopoles, have also been considered. Winbow teaches that multipole sources do not excite tube waves (which are only excited by monopole sources); that they do excite both S-waves and P-waves; that they achieve a greater depth of penetration of the acoustic wave into the formation; that multipole sources generally improve velocity measurement accuracy; and that a lower frequency (typically 1–2 kHz) is optimum for multipole excitation.

Although it was generally considered desirable for a full-wave acoustic logging tool to provide both monopole and multipole excitation at low frequencies, a number of substantial problems arose which were not overcome in prior tools. The first major problem was that of the acoustic power level. Heretofore, it was difficult to obtain reliable levels of acoustic wave data even for the conditions of conventional sonic logs: monopole excitation, uncased holes, hard rock formations, short receiver to transmitter spacing, and high frequencies. It inherently takes greater power to achieve multipole excitation, to penetrate through casing, to propagate through soft or unconsolidated formations, to propagate longer distances, and to excite lower frequencies. Combining these desirable features demanded a substantial increase in power level over prior tools. A second major problem was the generation of undesirable waves which obstructed the measurement of the desired wave. One undesirable wave, the tube wave, has already been discussed. As taught by Kitsunezaki and Winbow, perfect multipole acoustic sources do not generate tube waves. However, these sources do not always have perfect symmetry in practice, and may generate a residual monopole component which excites a tube wave. Since the tube wave is confined to the borehole, it generally does not attenuate as rapidly as S-waves and P-waves in the formation, and therefore even a residually excited tube wave becomes increasingly important at long transmitter-receiver spacing. Another major source of undesirable waves in prior tools was the vibration imparted to the tool body by operation of the source. This vibrational energy propagated through the tool body to the receiver section and obstructed measurement of acoustic waves from the formation.

In the asymmetric acoustic transmitter taught by Kitsunezaki, coils mounted on a bobbin assembly are placed in the magnetic field of a permanent magnet and current is passed through the coils to drive the bobbin assembly. The bobbin may be placed to move in a direction either perpendicular to the tool axis or parallel to the tool axis. In either case reverse thrust from the magnet is communicated to the tool body, and may cause an undesirable vibration to propagate in the tool. Kitsunezaki's asymmetric source cannot be driven at the low frequencies (1–2 kHz) and high power required for logging in most formations, nor can it operate at great depths or under great pressures.

Winbow teaches an asymmetric acoustic transmitter in which a cylinder of piezoelectric material is split into axial segments, which are then separately driven to produce a multipole acoustic source. Winbow's transmitter is severely limited in power capability, and reverse thrust from the piezoelectric components communicate undesirable vibration to the tool body. The transmitter is further limited in frequency range, and separate transmitters must be used to accommodate a variety of formation properties and borehole sizes. Angona, in U.S. Pat. No. 4,649,525, teaches an asymmetric acoustic transmitter different from Winbow's, but also limited in frequency range and power capability. It also communicates undesirable vibrations to the tool body.

Chung et al. in U.S. Pat. No. 4,685,091 teaches an asymmetric transmitter in which cylinders of magnetostrictive material are caused to vibrate longitudinally, projecting by acoustic reflection positive and negative acoustic pulses to opposite sides of the tool. The Chung transmitter is unable to operate at high power levels, and communicates undesirable vibration to the tool body. The Chung transmitter operates at frequencies depending on the length of the magnetostrictive cylinders, and separate transmitters must be used to accommodate a wide range of formation properties and borehole sizes.

A borehole seismic source based on magnetic pressure has been described by J. W. Tayton, et al., "Seismic Source for Small Borehole Operation", Society of Exploration Geologists, 61st Annual Meeting, Nov. 10, 1991, Houston, Tex. This device is an electromagnetically driven acoustic transmitter consisting of a triggered capacitor bank which discharges electricity through a flat coil. Eddy currents are induced in a copper or aluminum plate that is held against the coil by springs. The interaction of the resulting primary and secondary magnetic fields cause the plate to repel from the coil rapidly. A cavitation volume is produced in the water in the borehole, acting as the source of low to medium frequency sound. The Tayton acoustic transmitter has excellent power and frequency capabilities, but is limited to depths less than 500 meters. Furthermore, the Tayton transmitter communicates undesirable vibration to the tool body.

Hoyle et al. teach a tool vibration and attenuation apparatus in U.S. Pat. No. 5,036,945. The first attenuation and delay apparatus is positioned above the receiver and a second attenuation and delay apparatus is positioned below the receiver array. The first apparatus includes a plurality of interleaved rubber and metal washers, and the second apparatus includes a series of mass loading rings. The Hoyle invention is directed toward tool vibrational attenuation, but it will not function to reduce tube wave propagation.

Hoyle et al also teaches a receiver section in which a multiplicity of piezoelectric hydrophones are disposed in a series of axial measurement stations, each station containing four hydrophones around the circumference of the tool at 0°, 90°, 180°, and 270° azimuth angles. A hydrophone comprises a stack of piezoelectric disks connected in parallel, securely mounted to the tool structure and exposed to the pressure of the borehole fluid. The Hoyle hydrophones are reduced in sensitivity, since the entire crystal stack and not one face only is exposed to borehole pressure. Further the hydrophone stack is sensitive to tool vibration. Moreover, Hoyle does not provide separate channels of data from each hydrophone for further processing. Rather, he teaches prearranged combinations yielding monopole, dipole, and quadrupole receiver modes. The desired mode is selected by a switch to agree with the transmitter mode.

With respect to data processing, Kimball et al. in U.S. Pat. No. 4,594,691 teach the semblance method of processing acoustic waveforms to determine P-wave and S-wave velocities. The semblance method provides a measure of acoustic velocity by comparing the shape of waveforms measured at a sequence of axial measurement stations., Velocity measured by the semblance method is not true phase velocity of the acoustic wave, and is less accurate for determining formation properties. Furthermore the semblance method provides only an average velocity over several measurement stations, reducing the spatial resolution of the velocity measurement. J. D. Ingram et al. ("Direct phase determination of S-wave velocities from acoustic waveform logs", *Geophysics*, Vol. 50, No. 11, Nov. 1985, p. 1746–1755) describe a method for determining phase velocities by comparing the digital Fourier transform coefficients of waveforms measured at a sequence of axial measurement stations. Ingram uses cross-spectral correlation to find the best estimate of phase velocity averaged over several measurement stations. The Ingram method does not provide a direct measurement of phase velocity from phase arrival measurements, and it has a reduced vertical resolution because of the averaging process.

SUMMARY OF THE INVENTION

A general object of the present invention is to provide an improved acoustic logging system which overcomes the problems and disadvantages of prior acoustic logging tools and produces a new, higher level of performance in its operation.

Another object of the present invention is to provide an improved acoustic logging tool which includes a more powerful acoustic transmitter, a more sensitive acoustic receiver and a tube wave absorber section between the transmitter and receiver sections.

Another object of the present invention is to provide a new method for processing full-wave acoustic data to determine acoustic phase velocity.

Other objects of the present invention are to provide: (1) an acoustic transmitter which includes an electromagnetic actuator; (2) an acoustic transmitter which includes an acoustic waveguide; and (3) an acoustic well logging tool which includes an acoustic monopole transmitter, an acoustic x-dipole transmitter, an acoustic y-dipole transmitter, and an acoustic quadrupole transmitter.

Another object of the present invention is to provide an acoustic unipole transmitter for an acoustic logging tool.

A further object of the present invention is to provide a tube wave absorber for a logging tool that is capable of attenuating tube waves surrounding borehole fluid and also vibrational waves induced in the tool body of an acoustic logging tool.

A further object of the present invention is to provide an improved acoustic receiver for a logging tool which compensates for vibrational waves in the tool body.

A still further object of the present invention is to provide a new acoustic well logging tool which includes separate channels of full-wave receiver data for all sides of the tool.

Another object of the present invention is to disclose a new acoustic well logging tool which provides a selective response to monopole waves, dipole waves, quadrupole waves, and unipole waves by processing information from all sides of the tool.

Another object of the present invention is to provide a new method for processing full waveform acoustic data to obtain a direct measurement of acoustic phase velocity.

Yet a further object of the present invention is to disclose a method for processing full-waveform acoustic data which includes a new Heisenberg filter to provide optimum resolution simultaneously in frequency and time; and also to disclose a method for processing full-waveform acoustic data which includes the direct measurement of phase velocity at a multiplicity of selected phase points on the propagating acoustic wave.

In accordance with these and other objects of the present invention, an improved logging tool is provided which includes an acoustic transmitter section having at least one electromagnetic actuator and at least one acoustic waveguide. In the illustrated embodiment of a logging tool embodying the invention, a plurality of acoustic transmitters are disposed in the transmitter section to provide for selective modes of wave generation including monopole, x-dipole, y-dipole, and quadrupole modes. The aforesaid modes generate acoustic waves that include compression waves and shear waves but also undesirable tube waves. The electromagnetic actuator for the tool transmitter comprises a pusher plate pierced by holes, rigidly attached to a piston and held against a flat magnetic coil by a spring. Discharge of a capacitor through the coil causes an intense magnetic pressure to exert force on the pusher plate and move the piston. The holes in the pusher plate provide for a flow of insulating oil through the plate to avoid cavitation and enable operation of the actuator at great depths and high pressures. The moving piston applies force to generate an acoustic pulse in an acoustic transmission line or wave guide. A positive pressure pulse is generated by motion of the piston into a portion of the wave guide in front of the moving piston, and a negative pressure pulse is generated by motion of the piston out of another portion of another acoustic wave guide in back of the moving piston. The positive and negative pulses generated by the new electromagnetic actuator are guided by the acoustic wave guide within the tool to allow the actuator to be used either for a monopole, a dipole, a quadrupole, or a unipole transmitter. Each acoustic wave guide separates the electromagnetic actuator from borehole fluids, enabling the actuator to operate at peak power and efficiency when borehole conditions are widely varied. The acoustic wave guide may be tuned by resonance effects to achieve desired concentration of acoustic energy at selected frequencies.

A unique tube wave absorber means located within the tool between the transmitter and receiver sections comprises a fluid-filled tube containing a plurality of viscous absorbing elements. In the illustrated embodiment the absorbing elements are disposed at spaced intervals along the surface of a tube filled with viscous oil, each absorbing element comprising a plug of foamed metal set in a cylindrical housing. By selective disposition and design of the foamed metal plugs the wave absorber is tuned to specified resonant frequencies along its length, and by selective choice of oil viscosity and foam permeability the absorbing plugs provide maximum viscous absorption of acoustic energy at the specified resonant frequencies. Thus, tuning of the resonant frequency of the absorber is accomplished by varying the number of absorbing elements per foot along the length of the absorber section. The specified resonant frequencies vary continuously from one end of the tube wave absorber to the other, providing for a broad band of resonant absorption. The tube wave absorber attenuates undesirable tube waves propagating in the drilling mud surrounding the tool, while allowing desirable waves in the formation to pass freely. In addition, the absorbing elements attenuate undesirable flexural waves in the tube wall caused by tool vibration.

An improved acoustic receiver section according to the invention comprises at least one receiver assembly, each assembly comprising two piezoelectric crystals. One face of the first crystal is exposed to the pressure in the borehole fluid, and the other face is rigidly mounted to the tool body. One face of the second crystal is rigidly mounted to the tool body at the same location as the first crystal, the other face of the second crystal being free of pressure. By combining the calibrated output of the two crystals, a combined signal is produced which eliminates the effects of tool vibration, and provides a calibrated measurement of acoustic pressure at a single location on the tool. In the illustrated embodiment a plurality of receiver assemblies are disposed along the length of the tool, there being four axial measurement stations separated by pre-selected intervals, and four azimuthal measurement locations at 0°, 90°, 180°, and 270°.

In the preferred embodiment, means are provided for individual calibration, amplification, digitization and recording of each receiver assembly separately. This provides original data for subsequent processing representing actual pressure received at specific locations of the tool. The ability to measure actual pressure at specific locations, rather than electronically combining signals in prearranged modes (monopole, dipole, etc.) provides the capability for determining whether the received acoustic signal is in fact operating in the desired transmitter mode, or is affected by undesirable waves such as tube waves.

A new digital signal processing method according to the invention utilizes the signal data from each receiver assembly in the receiver section of the tool and includes the steps of: 1) reconstructing monopole, dipole, quadrupole, and unipole acoustic receiver modes from the separate receiver assembly locations at four sides of the new tool; (2) processing real waveform data for each receiver assembly by digital Fourier transforms; (3) using a new Heisenberg filter for obtaining optimum frequency-time resolution; (4) using a Hilbert transform to provide an analytic waveform; and (5) performing a statistical analysis of a multiplicity of phase arrival points from a plurality of receiver assemblies-to provide an accurate measure of true acoustic phase velocity for both compressional waves and shear waves.

Other objects and features of the invention will become apparent from the following detailed description taken with the accompanying drawings.

BRIEF DESCRIPTION OF THE DRAWINGS

FIG. 1 illustrates a borehole traversing a typical earth formation and containing an acoustic logging tool in accordance with the present invention.

FIG. 1A is an enlarged view similar to FIG. 1, showing the logging tool in perspective and illustrating the paths of acoustic waves generated by its acoustic transmitter propagating through the formation, reflecting from a distant geological structure such as an oil pocket, and returning to the acoustic receiver of the acoustic logging tool.

FIG. 2 is a diagrammatic view in elevation showing a block representation of the major components of an acoustic logging tool embodying principles of the present invention.

FIG. 3 is a view in perspective showing a typical acoustic transmitter section for the tool of FIG. 2, which includes four transmitter assemblies for generating acoustic waves in the following modes; monopole, dipole polarized in the y-direction, dipole polarized in the x-direction, and quadrupole mode, the direction of the waves being indicated by arrows.

FIG. 3A is an enlarged fragmentary view in section illustrating the construction of a monopole transmitter assembly for a logging tool of the present invention.

FIG. 3B is a view in section taken at line 3B—3B of FIG. 3A.

FIGS. 4A, 4B and 4,C are fragmentary views in perspective with portions broken away to show a diverter which illustrate the diversion of acoustic pulses within the acoustic waveguide of a transmitter section for a logging tool according to the present invention for producing monopole, dipole, and quadrupole transmitter modes.

FIGS. 5A to 5E are transverse views in section of the transmitter wave guides for a logging tool of the present invention which illustrate the location of exit holes on the acoustic transmitter that produce monopole, x-dipole, y-dipole, quadrupole, and unipole modes.

FIG. 6A is a diagram illustrating the propagation of acoustic pulses in an acoustic waveguide of the present invention, presenting as the location of pulses as a function of time.

FIG. 6B is a fragmentary view in cross section of a transmitter wave guide section according to the invention which schematically illustrates a monopole transmitter assembly capable of producing the acoustic pulse propagation diagram shown in FIG. 6A.

FIG. 6C is a schematic illustration of pressure pulses which may be measured at various locations of the transmitter wave guide assembly identified on FIG. 6B.

FIG. 6D is a curve illustrating the power spectrum provided by the acoustic pulse of the monopole acoustic transmitter of FIG. 6A.

FIG. 7A is a diagram illustrating the propagation of pulses of acoustic pulses in the wave guide of a tuned monopole transmitter assembly of the present invention.

FIG. 7B is a fragmentary view in cross section of a wave guide section for a tuned monopole transmitter assembly capable of producing the acoustic wave diagram of FIG. 7A.

FIG. 7C is a curve showing typical pressure pulses for the tuned monopole transmitter of FIG. 7B.

FIG. 7D is a curve illustrating the power spectrum for the tuned monopole transmitter of FIG. 7B.

FIG. 8A is a diagram illustrating the propagation of acoustic pulses in a waveguide of a tuned dipole transmitter assembly of the present invention.

FIG. 8B is a fragmentary view in cross section of a wave guide section for a tuned dipole transmitter assembly capable of producing the acoustic wave diagram of FIG. 8A.

FIGS. 8C and 8D are curves illustrating positive and negative pulse characteristics for the tuned dipole transmitter of FIG. 8B.

FIG. 8E is a curve illustrating the power spectrum for the tuned dipole transmitter of FIG. 8B.

FIG. 9 is a fragmentary view in elevation and in section showing the construction of an electromagnetic acoustic wave actuator of the present invention.

FIG. 9A is a view in section similar to FIG. 9, illustrating the motion of moving parts of the electromagnetic actuator.

FIG. 10 is an. exploded view in perspective further illustrating components of the electromagnetic actuator of FIG. 9.

FIG. 11A is a diagram illustrating an electric switching circuit for controlling the electromagnetic actuator of FIG. 9.

FIGS. 11B–11D are curves illustrating parameter variations with respect to time for the electromagnetic actuator of FIG. 9.

FIG. 12A is a fragmentary view in elevation of the tube wave absorber of the present invention with a portion broken away to show internal construction.

FIG. 12B is a view in section of the tube wave absorber of FIG. 12A, with its outer membrane removed and portions broken away to show further internal structural details.

FIG. 12C is an enlarged fragmentary view in section showing the construction of one energy absorbing element in the tube wave absorber of FIG. 12A.

FIG. 13 is a curve illustrating the attenuation of acoustic waves in the borehole at two borehole temperatures provided by the tube wave absorber of the present invention.

FIG. 14A is a view in elevation showing an acoustic receiver for the logging tool of the present invention having a multiplicity of receiver assemblies.

FIG. 14B is an enlarged view in section taken at line 14B—14B of FIG. 14A illustrating the disposition of receiver assemblies circumferentially around the transmitter.

FIG. 15A is an enlarged fragmentary view in section of one receiver assembly for the receiver section of the present invention.

FIG. 15B is a view in section showing a piezoelectric crystal stack for the receiver assembly of FIG. 15A.

FIG. 15C is an exploded view in perspective of the receiver assembly shown in FIG. 15A.

FIGS. 16A–16C are curves that illustrate the cancellation of noise signals arising from tool acceleration caused by vibrational waves in the tool.

FIG. 17 is a block diagram that illustrates schematically the electronic and digital circuitry in the present invention for providing a digital representation of acoustic waveforms.

FIG. 18A is a curve representing typical received signal waveforms with respect to time.

FIG. 18B is a flow diagram illustrating processing steps of the present invention to provide an acoustic phase velocity output.

FIG. 19A is a curve that illustrates response characteristics of the processing filter of the present invention as a function of frequency.

FIG. 19B is a curve that illustrates response characteristics of the processing filter of the present invention as a function of time.

FIGS. 20A–20D are a series of diagrams that illustrate the determination of phase velocity by correlating selected phase points on filtered pulse waveforms from spatially separated receiver stations.

DETAILED DESCRIPTION OF THE PREFERRED EMBODIMENT

With reference to drawing, FIG. 1 illustrates an improved acoustic logging system embodying principles of the present invention which includes an elongated subsurface module 10, also called a logging tool or sonde. The logging tool 10 is suspended from a wireline cable 12 within a borehole 14 which traverses a subterranean formation of interest. Such formations may include suspected hydrocarbon bearing strata indicated by reference character 16 or an acoustically reflecting geological structure such as an oil pocket indicated typically by reference character 18. These formations and structures all have distinctive characteristics relative to their physical location, reflection characteristics, or acoustic wave velocities. The well 14 may be cased or uncased and is filled with a liquid such as a drilling mud indicated by reference numeral 20.

At its upper end, the wireline cable 12 passes through a sheave 36 to a winch drum 38 in a surface module 40 such as a service truck. The surface module 40 provides for tool electric power, digital data processing, and digital recording of waveform data. During its operation, the tool 10 is continuously raised by means of the winch drum 36 as data is transmitted from the tool to the surface module 40.

General Description of the Logging Tool

As shown in FIG. 1A, the logging tool 10 comprises a command section 22 containing analog and digital circuitry for receiving electric power and digital command signals through the wireline cable 12 and for transmitting digital measurement data back through the cable 12; a generator section 24 containing energy storage capacitors and pulse discharge switching circuitry capable of supplying pulse power levels in excess of one million watts; a transmitter section 26 containing a multiplicity of high power acoustic transmitters; a tube wave absorber section 28; an acoustic receiver section 30; a preamplifier section 32 providing analog preamplification and filtering for the acoustic receiver section 30; and a data acquisition section 34 providing for analog-to-digital signal conversion of acoustic waveforms.

At preselected time intervals the generator section 24 discharges a pulse of high power into the transmitter 26. As illustrated in FIG. 1A, an intense acoustic wave is produced by and emitted from the transmitter section 26. In passing from the transmitter section 26 to the receiver section 30, acoustic energy may: propagate a distance from the borehole along a path indicated by reference character 44, reflect from a geological structure 18, and return along a path indicated by reference character 46 to the receiver 30; propagate through the drilling mud 20 which surrounds the tool to the borehole wall 14 and refract along the borehole in a path indicated by reference character 48, passing again through the drilling mud 20 to the receiver 30; propagate through the drilling mud 20 to the receiver 30, a path indicated by reference character 50; and/or propagate directly through the structural components of the tool 10 from the transmitter 26 to the receiver 30, a path indicated by reference character 52.

Useful information is conveyed by acoustic waves propagating along acoustic paths 44, 46, and 48 passing through the formation 16 or reflecting off a geological structure 18. Acoustic waves propagating along acoustic path 50 in the mud 20 or acoustic path 52 in the tool 10 represent undesirable noise, but they are attenuated by the tube wave absorber 28.

The aforesaid major components of the logging tool 10 are shown diagrammatically in somewhat greater detail in FIG. 2. The surface module 40, preferably located on a logging truck adjacent to the borehole includes a communication and power unit 200 connected to a digital computer 210 which is also connected to an appropriate memory or storage device 220 and a display device 230. The connection details and operation of such components are well known to those skilled in the art.

Within the tool 10 itself, the command section 22 includes a communication and power section 240 which receives power and control signals from the surface module 40. This power section is connected through a control circuit 245 to a computer 250 that controls tool operation. In the generator section 24, are storage capacitors 255 energized by a power supply 260. A pulse discharge switching circuit 262 controls the pulse power from the capacitors to electromagnetic actuators 84 of the transmitter section 26. In the arrangement shown, pulse power from each capacitor 255 is furnished to two switches 263 each of which is connected to a magnetic coil 264 for an actuator 84 in the transmitter section 26. Thus, each actuator 84 is controlled by a separate coil 264. Four actuators 84, 84A, 84B and 84C are shown diagrammatically in FIG. 2 which provide four operating modes in this embodiment.

The absorber section 28 has no electrical connections and its structural features will be described below.

In the receiver section 30, four receiver stations are provided at axially spaced locations on the tool (321, 322, 323 and 324. Each station consists of four receiver assemblies 156 circumferentially spaced apart on the tool. Each station is capable of providing four different receiver modes, as will be described below. Each receiver assembly is connected separately to an amplifier in an amplifier bank 326 of the pre-amplifier section 32. The output of each amplifier in the bank 326 is furnished to an analog-to digital converter in a bank 328 of such converters in a converter section 34. The digital output of each A/D converter in turn is sent via line 259 back to the control module 245 of the command section 22.

The Transmitter Section

The transmitter section 26 of the logging tool 10 is illustrated in FIG. 3. It includes a long steel outer tube 54 connected to an upper portion of the acoustic tool 10 by means of end subs 56, through which pass conventional electrical and digital connecting wires (not shown) which are sealed in order to withstand high pressures. The interior volume of the transmitter section 26 is subdivided into a multiplicity of transmitter assemblies, each of which delivers a specified acoustic pressure pulse through specified exit holes 58. The interior volume of the transmitter section 26 is filled with a suitable insulating oil, for example Capella WF 32 compressor oil manufactured by Texaco. This oil is retained within the transmitter section and thus separated from the exterior borehole fluid by a flexible membrane 72, (FIG. 3A) such as a reinforced high temperature rubber material. This membrane extends around the outer tube 54 and allows free passage of an acoustic pulse through exit holes 58 while preventing intrusion of drilling fluid into the transmitter.

In one preferred embodiment of the present invention, as shown in FIG. 3, there are four transmitter assemblies stacked vertically within the interior volume of the transmitter section 26 including the following subsections:

(1) A first monopole transmitter 60, containing two exit holes 58 disposed to deliver positive pressure pulses 68 symmetrically from opposite sides of the transmitter section 26; (2) A second or Y-dipole transmitter 62, containing two exit holes 58 disposed to deliver a positive pressure pulse 68 on one side of the transmitter section 26 and a negative pressure pulse 70 on the opposite side; (3) A third X-dipole transmitter 64, containing two exit holes 58 disposed in a perpendicular direction from the Y-dipole transmitter 62, to provide a positive pressure pulse 68 on one side and a negative pressure pulse 70 on the opposite side; and (4) A fourth quadrupole transmitter 66, containing four exit holes 58 disposed to deliver alternating positive and negative pressure pulses at 90° intervals around the outer tube 54.

As indicated schematically in FIG. 3A and FIG. 3B, the monopole transmitter assembly 60 includes a central or inner tube 74 and a concentric middle tube 76. The annulus between inner tube 74 and middle tube 76 provides an oil filled chamber for use as an inner acoustic waveguide 78. Correspondingly, the annulus between middle tube 76 and outer tube 54 provides another oil filled chamber for use as an outer acoustic waveguide 80. The volume within the inner tube 74 is used as a conduit for wires within the tool. When deeply submerged in a borehole, the interior volume of oil is compressed by the hydrostatic pressure exerted by the borehole fluid, with typical pressures reaching 15,000 psi. To allow for compression of the oil, a small gap 92 (e.g. 0.125 inches) is provided between the flexible membrane 72 and the outer tube 54.

An annular electromagnetic actuator 84 (shown symbolically in FIG. 3A) is provided within the inner acoustic waveguide 78. This actuator 84 causes a positive acoustic pressure pulse 68 to be generated that propagates in one direction into the inner acoustic waveguide 78, and a corresponding negative acoustic pressure pulse 70 that propagates in the opposite direction into the inner acoustic waveguide 78. The positive pressure pulse 68 propagates through the inner acoustic wave guide 78 into the outer acoustic waveguide 80, changing direction by virtue of the reflector 88. Coupling holes 82 are provided between the inner waveguide 78 and the outer waveguide 80. To minimize undesirable acoustic reflections and provide for an efficient transfer of acoustic energy from the inner waveguide to the outer waveguide, the cross-sectional area of the inner acoustic waveguide 78, the outer acoustic waveguide 80, and the coupling holes 82 are substantially equal, a procedure known to those skilled in the art of acoustic waveguides.

In this manner the positive acoustic pulse 68 is caused to propagate from the actuator 84 through the inner and outer waveguides 78 and 80 to the exit holes 58 on each side of the monopole transmitter assembly 60 without substantial loss of energy. In accordance with well known principles of acoustic waveguides, the acoustic pressure transmitted to the external borehole fluid depends on the ratio of acoustic impedance of the borehole to that of the acoustic transmission line. In general, the acoustic impedance of the borehole depends on acoustic properties of the drilling mud and the size of the borehole, and therefore may vary from one well to another, or even depend on depth in any particular well. In most circumstances the borehole impedance is less than the waveguide impedance, causing the exit pressure to be reduced from the positive pressure pulse 68.

In a corresponding manner the actuator 84 causes a negative pressure pulse 70 to propagate through the inner waveguide 78, the waveguide coupling holes 82, and the outer waveguide 80. The negative pressure pulse, however, is obstructed from the exit holes 58 by a monopole pulse diverter 86 which extends between the middle and outer tubes 76 and 54. Consequently, the acoustic pulse delivered to the borehole by the monopole transmitter assembly 60 consists of a positive pulse only, balanced equally between one side of the tool and the other.

FIG. 4A, FIG. 4B, and FIG. 4C illustrate various pulse diverters for use with monopole, dipole, and quadrupole transmitters. As described above, the monopole pulse diverter 86 allows the positive pressure pulse 68 to exit only from exit holes 58A on opposite sides of the tool, and it also blocks the negative pulse (FIG. 4A). The monopole pulse diverter is also used for the unipole transmitter (not shown), the difference being that the unipole has only one exit hole, whereas the monopole has two exit holes 58A on opposite sides of the tool. As shown in FIG. 4B, the dipole pulse diverter 94 diverts the positive pressure pulse 68 to one side of the tool which exits through hole 58B and the negative pressure pulse 70 to the opposite side of the tool 10 which passes through a hole 58C. The quadrupole pulse diverter 96 diverts the positive pulse 68 to two oppositely situated exit holes 58D and the negative pulse 70 to two oppositely situated exit holes 58E, as shown in FIG. 4C.

FIG. 5A through FIG. 5E schematically indicate the exit hole orientation for different modes of transmitter operation. FIG. 5A shows the monopole configuration described above, wherein a positive pulse is emitted equally on opposite sides of the tool. FIG. 5B shows a dipole source oriented in the x-direction, wherein a positive pressure pulse is produced on one side of the tool and an equal and opposite negative pressure pulse is produced on the other side of the tool. FIG. 5C shows a dipole source oriented in the y-direction, with indicated pressure pulses. A quadrupole transmitter has four exit holes, as illustrated in FIG. 5D, with positive and negative pulses from equally spaced ports alternating around the circumference of the tool.

Another configuration, called a unipole configuration, is shown in FIG. 5E and comprises a nonsymmetric source with a single exit hole 58A on one side of the tool. The unipole source may be shown to excite the monopole mode and all multipole modes simultaneously. When combined with the independent receiver channels of this invention, a unipole source may provide both monopole and multipole data from a single transmitter section in a single logging transit of the borehole, thereby saving both costs and time compared to separate transmitters or multiple logging transits of the borehole.

FIG. 6A through FIG. 6D further illustrate steps in the generation of an acoustic pulse from the monopole transmitter 60. The implementation selected for describing acoustic pulse travel is the preferred implementation for echo-location of geological structures at a considerable distance from the borehole, for which purpose a single positive pressure pulse is desired. In this implementation, the length of the transmitter assembly 26 is approximately 160 inches. Shorter implementations, more typically 12 to 20 inches, may be used for other logging applications where pulse interactions and resonance are desirable.

An acoustic wave diagram is represented in FIG. 6A where time is on the vertical axis and distance on the horizontal axis. FIG. 6B, shown to the same scale, schematically represents a cross-section of the monopole transmitter 60 more fully described in FIG. 3A. Referring now to FIG. 6A, which has the same horizontal dimensional scale as FIG. 6B, a positive pulse traveling to the left (illustrated by a solid line) and a negative pulse traveling to the right (illustrated by a dashed line) are initiated within the inner acoustic waveguide by the action of the electromagnetic actuator 84 at the start time T0. The positive pulse travels to the left at acoustic velocity of oil in the acoustic waveguide, i.e., approximately 40 inches per millisecond (40 in/msec). The positive pulse travels half the length of the monopole transmitter assembly, in this case 80 inches, in approximately 2 msec, arriving at time T1. The positive pulse propagates through the waveguide coupler holes 82 to the outer waveguide 80, where it travels for another 2 msec, arriving at the exit hole 58 at time T2. At this time a positive pulse is propagated into the borehole, and a new negative pulse of smaller amplitude is reflected (due to impedance mismatch with the borehole fluid) back into the outer waveguide. This negative pulse retraces the prior path, traveling in the opposite direction, and passes through the waveguide coupler holes to the inner waveguide 78 at time T3. At time T4 this negative pulse arrives traveling to the right at the location of the actuator. Since the actuator is only active during the pulse, namely a fraction of a millisecond after T0, at time T4 the actuator assembly acts as a high impedance reflector of acoustic waves, and reflects the negative wave as a negative wave traveling to the left. The negative wave continues traveling, passing through the waveguide coupling holes at time T5, and arrives at the exit hole 58 at time T6. Due to impedance mismatch, the negative pulse is reduced in amplitude as it exits the exit hole, and causes a reflected wave of smaller amplitude to begin retracing the acoustic path within the transmitter.

Referring again to FIG. 6A, at time of actuation T0, a negative pulse (represented by a dashed line) is also generated, traveling to the right. This wave travels in a manner corresponding to the positive pulse described above, except that it is obstructed by the monopole wave diverter 86, as more fully illustrated in FIG. 3A. The negative pulse is reflected from the monopole pulse diverter at time T4, the same time the positive pulse exits the transmitter. The negative pulse then continues to reflect back and forth in the right side of the monopole transmitter illustrated in FIG. 6B, losing some energy at each reflection, until the energy of the negative pulse dissipates.

Acoustic pressures, as measured for example by pressure gauges located in the acoustic waveguide at specified locations, are illustrated schematically in FIG. 6C. Pressure at the exit hole 58, which represents the output of the transmitter into the borehole, is a single positive pulse at time T2 (approximately 4 msec after actuation), followed by a much smaller negative pulse at time T6 (approximately 12 msec after actuation). In the inner waveguide at location P, a positive pulse begins just prior to time T1, a negative pulse of smaller magnitude appears just after time T3, and another negative pulse just prior to T5. Similarly, in the outer waveguide at location P, a positive pulse appears just after time T1, a negative pulse just prior to T3, and another negative pulse just after time T5. Acoustic pressures at location M show the negative wave traveling back and forth in the acoustic waveguide between the actuator location and the monopole pulse diverter, losing amplitude as a result of reflective losses.

The monopole output pulse, as shown schematically in FIG. 6C, consists essentially of a single high-amplitude positive pressure pulse. The negative pulse arriving at time T6 is of much smaller amplitude and arrives at a time well beyond experimental interest. The experimental frequency spectrum of this pulse is extremely broad, ranging from very low seismic frequencies (less than 100 Hz) to approximately 10 kHz, and it is ideally suited for accurate location and ranging of geologic structures up to several hundred feet away from the borehole.

In the preferred implementation of the monopole transmitter assembly shown schematically in FIG. 7A through 7D, the monopole pulse diverter is removed and the assembly is tuned to maximize output in a frequency spectrum suitable for refraction measurements of formation velocities, peaking at approximately 1 kHz. Referring now to FIG. 7A, the actuator initiates a positive pressure pulse traveling to the left (and a negative pulse traveling to the right), in the inner waveguide at the initial time T0. The positive pulse passes through the waveguide coupling holes 82 at time T1, propagates to the right in the outer waveguide, and reaches the exit hole 58 at the time T2. There is no diverter in this implementation, so that in addition to generating a positive pulse in the borehole together with a negative reflected pulse (as in the implementation discussed with reference to FIGS. 6A and 6B)) a transmitted positive pulse of lower amplitude continues to propagate to the right. As discussed above, the negative reflected pulse travels back through the outer waveguide, passing through the waveguide coupling holes at time T3, reflecting as a negative pulse from the actuator assembly at time T4, passing again through the waveguide coupling holes 82 at time T5, and arriving as a negative wave at the exit hole 58 at time T6. Considering now the negative pulse produced at T0 traveling to the right, it may be adjusted in time to match the arrival of the negative reflection wave just described by suitably choosing the length of that portion of acoustic waveguide through which the negative pulse travels. In particular, by choosing the length of the negative side to be three times the positive side, coincidence of negative pulse arrival is achieved. Preferred dimensions for this tuned implementation of the monopole transmitter assembly is 12 inches, with 3 inches on the positive wave side, and 9 inches on the negative wave side. In this case the negative wave passes through the waveguide coupling holes 82 at time T3, then propagates to the left, and arrives at the exit holes 58 at time T6. Exit pressure for the tuned monopole configuration is illustrated in FIG. 7C. Arrival of the positive pulse at the exit hole begins at T2 (approximately 0.15 msec after T0), and the negative pulse begins at T6 (approximately 0.45 msec after T2). The tuned monopole makes full use of both the positive pulse and the negative pulse generated by the electromagnetic actuator.

The power spectrum of the output pulse is shown schematically in FIG. 7D, showing a peak near 1.5 kHz.

The preferred implementation of the dipole transmitter assembly is schematically illustrated in FIG. 8A through FIG. 8D. The length of the transmitter is adjusted to provide resonance at a desired frequency of about 1 kHz, a length of approximately 10 inches. In FIG. 8A a positive pulse is initiated at time T0 which travels to the left through the inner waveguide, passing through the waveguide coupling hole at time T1 and propagating through the outer waveguide to the left, arriving at the exit hole at time T2 (approximately 0.25 msec). A negative pulse is also initiated at time T0 which travels to the left through the inner waveguide, passes through the waveguide coupling hole at time T1, and travels through the outer waveguide to an exit hole at time T2. The exit hole for the positive pulse is situated on the opposite side of the tool from the exit hole for the negative pulse, as illustrated in FIG. 5B and FIG. 5C. The positive pulse is directed toward the positive exit hole 58, and the negative pulse is directed toward the negative exit hole 59 by the dipole pulse diverter, as illustrated in FIG. 4B. Referring again to FIG. 8A, the positive pulse reflects from the exit hole as a negative pulse at time T2, and travels to the left in the outer waveguide. This reflected negative wave passes through the waveguide coupling hole at time T3, reflects from the actuator assembly at time T4, passes again through the waveguide coupling hole traveling the opposite direction at time T5, and arrives at the exit hole as a negative pulse at time T6 (approximately 0.5 msec after T2). Exit pressure at the exit hole associated with the positive pulse is shown schematically in FIG. 8C. The positive pulse starts at time T2, and the reflected negative pulse, at a lower amplitude, arrives at time T6. The power spectrum of this output pulse is shown schematically in FIG. 8E, showing a peak near 1 kHz. Exit pressure at the exit hole associated with the negative pulse is shown schematically in FIG. 8D. This negative pulse is an exact negative or mirror image of the positive pulse shown in FIG. 8C, but exits on the opposite side of the tool as shown in FIG. 8B.

The Electromagnetic Actuator

The preferred embodiment of the electromagnetic actuator 84 within the transmitter section of the tool 10 is schematically illustrated in FIG. 9, FIG. 9A, and FIG. 10. An insulated flat copper coil 100, which may be approximately 90 turns of copper wire of dimension 0.1 inch width by 0.005 inch thickness, is wound on an insulated annular coil support plate 114 containing an array of holes 116. This coil support is situated on and transverse to the central cylindrical tube member 74 extending along the central axis of the tool and is fixed to its cylindrical wall 76. A generally flat and disk-shaped pusher plate 102, preferably made of aluminum, is held against the coil 100 that is retained by the support 114, by means of a coil spring 110. The latter is held in place on the inner tube member 74 by an annular spring support 112 fixed thereto. The pusher plate 102 is faced with a copper disk 120 and is pierced with an array of holes 118 which extend through the plate 102. The pusher plate 102 is provided with a front piston 104 which extends through a fixed, transverse baffle plate 108 into a chamber forming the inner waveguide 78. The pusher plate is also rigidly connected to a back piston 106, typically by means of screw threads 79 in a central bore. The back piston 106 extends through another transverse baffle plate 109 into another chamber that forms the inner acoustic waveguide 78A. A second or rear spring 111 around the tube member 74 is situated between a fixed spring support 113 thereon and the face of the back piston 106. The front and back portions of the actuator 84, including springs 110 and 111 and spring supports 112 and 113, are made to be as symmetric as possible, except that spring tension in the front spring 110 exceeds that in the back spring 111 in order to cause the pusher plate 102 to be firmly clamped against the coil 100. Both wave guide chambers 78 and 78A as well as the smaller spaces on opposite sides of the support plate 114 are filled with oil, as previously described.

Referring now to FIG. 9A, which illustrates the position of the electromagnetic actuator 84 approximately 0.1 msec after actuation, the pusher plate 102 is shown repelled from the coil 100 by the action of magnetic fields schematically illustrated by reference character 130. The direction of pusher plate motion, illustrated by reference character 132, is communicated to both the front piston 104 and the rigidly connected rear piston 106. An important feature of this actuator are the holes 118 through the pusher plate which allow the surrounding insulating oil to flow into the space behind the moving piston, and also the holes 116 through the coil support plate 114, which allow insulating oil displaced by the back piston 106 to flow to the front of the coil support. The flow of oil through the pusher plate holes 118 is illustrated by the arrows 134, and the flow of oil through the coil form holes 116 is illustrated by the arrows 136. The rapid motion of the front piston 104 into the inner acoustic waveguide 78 when the magnetic coils are electrically energized causes a positive acoustic pressure pulse to be formed, which thereafter propagates toward the exit holes 58 of the tool 10 as previously described. Motion of the back piston 106 out of the inner acoustic waveguide 78A simultaneously causes a negative acoustic pressure pulse to be formed, which propagates in the opposite direction as previously described. Since the front piston 104 and the back piston 106 are rigidly connected, the motions are identical, causing the negative pulse to be an exact negative replica of the positive pulse.

The electromagnetic actuator 84 of the present invention is based on the concept of magnetic pressure, more generally known as the Maxwell electromagnetic stress tensor. The concept of magnetic pressure is well known, and has been the basis of numerous applications. When an intense magnetic field is created, for example by currents flowing through a flat coil in proximity to a conducting metal plate, the reaction of the magnetic field on the flowing currents is accurately described by a magnetic pressure, numerically equal to the specific energy (energy per unit volume) of the contained magnetic field. By confining the magnetic field to a very small volume and delivering substantial quantities of electrical energy to the coil, high driving pressures may be achieved. The only practical limit on pulse pressures produced by this method is the necessity for keeping pressures well below the values which may cause damage to unprotected borehole walls or cement bonds behind well casing.

Tayton describes a borehole seismic source (J. W. Tayton, et al., "Seismic Source for Small Borehole Operation", Society of Exploration Geologists, 61st Annual Meeting, Nov. 10, 1991, Houston, Tex.) based on earlier work by Edgerton (H. E. Edgerton, "The 'Boomer' Sonar Source for Seismic Profiling", Journal of Geophysical Research, Vol. 69, No. 14, July, 1964, p. 3033–3042). The "boomer" acoustic source is based on the use of magnetic pressure to create an acoustic pulse. An aluminum plate is held against a flat disk-shaped coil by heavy springs, the entire assembly being submerged in fluid (seawater or borehole fluid). Electrical energy from a capacitor bank is discharged through the coil, producing magnetic pressures so intense that the fluid contained between the plate and the coil ruptures. The aluminum plate accelerates away from the disk coil, producing a large cavity and driving a positive high pressure acoustic pulse into the fluid. Because it is dependent on creating a cavity in the fluid, the boomer acoustic source cannot operate at the borehole depths and high fluid pressures required for acoustic well logging. The Tayton source is limited to depths less than 1500 ft, while commercial logging at depths exceeding 15,000 ft is relatively common.

The electromagnetic actuator of the present invention improves upon the boomer concept by eliminating the requirement for fluid cavitation. As illustrated in FIGS. 9A and 10 the aluminum pusher plate 102 is pierced by a large number of holes 118 and thus allows fluid to pass through the pusher plate as it is repelled from the coil 100 by magnetic pressure. The total area of the holes is made as large as practicable, given the competing requirements for mechanical strength and electrical conductivity of the pusher plate. In the preferred embodiment, the hole area is approximately 25% of the pusher plate area, and the pusher plate is faced with a layer 120 of approximately 0.03 inches of copper to improve electrical conductivity. Acoustic pressures are generated in the present invention by motion of pistons 104 and 106 in an acoustic waveguide, magnetic force on the pusher plate 102 being the actuating mechanism. As long as hydrostatic pressure of the insulating oil exceeds the negative pressure pulse no cavity ever forms in the oil, and the electromagnetic actuator 84 readily accommodates borehole depths of 15,000 feet. For shallow wells (less than approximately 700 feet) cavitation may occur at the back piston 106 if the total pressure (pulse pressure plus hydrostatic pressure) becomes negative, thereby causing the negative pulse to lose symmetry compared to the positive pulse.

Referring now to FIG. 11A, the electromagnetic actuators of the present invention are energized by conventional capacitor charging and discharging circuitry well known to those familiar with the art. A high-voltage direct current charge from a high voltage power supply 260 is used to charge a high voltage capacitor 255. In the preferred embodiment, a 44 microfarad capacitor is charged to 2200 volts, providing a capacitive energy storage of approximately 106 joules per pulse. Preferably, there are two capacitors 255, each providing pulse energy for two actuators, for a total of four actuators 84, 84A, 84B and 84C in the transmitter section 26 of the preferred embodiment. As illustrated in FIG. 2, there are four transmitters in the transmitter section 26, each requiring one electromagnetic actuator. As shown in FIG. 11A, each selected actuator is pulsed by electronically closing its associated high voltage switch 263, thereby causing a current to flow in the coil of an actuator 84 and initiating magnetic action as described.

Current flow as a function of time after actuation is illustrated in FIG. 11B. Electromagnetic power delivered by the discharging capacitor to the actuator is illustrated in FIG. 11C, reaching a peak of approximately one megawatt in the preferred embodiment. The resulting positive acoustic pressure pulse delivered to the inner acoustic waveguide by motion of the front piston 104 of the actuator 84 is illustrated in FIG. 11D. A symmetric negative acoustic pressure pulse is delivered to the inner acoustic waveguide 78 by motion of the back piston 106.

The Tube Wave Absorber

Referring now to FIGS. 12A to 12C, there is illustrated the tube wave absorber section 28 of the present invention. A long steel tube 140, approximately 15 feet long by 4.5 inches diameter in the preferred embodiment, is secured to the subsurface module of the acoustic well logging tool of the present invention by means of end subs 56. The tube 140 is pierced by a large number of spaced holes 142, each containing an absorber assembly 150. Viscous oil 146, such as Dow Corning 200 Silicone Fluid, 350 centistokes viscosity, completely fills the interior of the tube 140. A flexible rubber membrane 148 surrounds the tube 140 and seals the interior of the tube 140 from borehole fluids, while allowing free passage of acoustic pressures.

Each absorber assembly 150, as shown in FIG. 12C, comprises an annular support member 151 which is secured (as by threads) within a hole 142 in the steel tube 140 and extends inwardly therefrom. Each member 151 contains an absorbing element 152, which in the preferred embodiment is a disk of foamed aluminum (40 pores per inch), 0.75 inch diameter by 0.25 inch thick, manufactured by ERG Materials and Aerospace Corporation, Oakland, Calif. Each acoustic element 152 provides an inductive acoustic reactance due to fluid flow through its pores and an acoustic resistance due to viscous interaction with the pore walls. The foam absorber 152 and viscous fluid 146 are selected to provide an acoustic "q" factor of approximately one (that is, the absorber resistance is numerically equal to the absorber reactance). The spacing density of the holes 142, each containing an absorber assembly 150, is selected to provide lateral acoustic resonance at selected frequencies along the length of the absorber tube 140. The lateral resonance consists of acoustic energy resonating between the acoustic volume capacitance of the internal oil 146, through the spaced absorbing assemblies 150, to the acoustic volume capacitance of the external borehole fluid. Acoustic energy is dissipated and turned into heat energy by the acoustic resistance of the absorbing foam element 152.

Now referring back to FIG. 1A, there is shown the path 50 an acoustic wave may take in passing from the transmitter section 26 to the receiver section 30 through the drilling mud 20. This wave, commonly called a tube wave, propagates through drilling mud in an annular region bounded on the inside by the tool body and on the outside by the formation (or, for cased holes, by steel casing). The tube wave propagates by means of an interaction between the longitudinal inertial reactance of the fluid mass and a transverse capacitive reactance. In an ideal waveguide the transverse capacitive reactance is due solely to compression of the fluid. In this case the acoustic wave propagates without energy loss at the sound speed of the fluid. Compression of the formation at the borehole wall introduces an additional component of transverse reactance in addition to the fluid compressibility, causing the tube wave to travel without energy loss at a velocity which depends on formation properties as well as fluid properties.

Conventional logging tools provide a transverse compressibility that is negligible for tube wave propagation, and the tube wave propagates without appreciable energy loss from the transmitter to the receiver. This fact restricts conventional logging tools either to measure acoustic velocities which exceed the tube wave velocity, or to operate in multipole modes that do not excite tube waves (by virtue of the fact that there is no net fluid volume change).

The tube wave absorber of the present invention introduces a transverse impedance to the propagating tube wave which includes resistive elements as well as capacitive and inductive reactances. The resistive elements of the transverse impedance cause energy to be dissipated, and consequently the tube wave is attenuated. It is readily shown, using conventional acoustic waveguide theory, that a resonating transverse impedance with a "q" factor of approximately one provides maximum attenuation of the propagating tube wave.

In the preferred embodiment the transverse impedance elements comprise a multiplicity of metal foam absorbers in a steel tube filled with viscous oil, as described above. Resonance frequency is adjusted by the number of absorbers per foot of tube length. In the preferred embodiment the frequency band of maximum attenuation (the "stop" band), is chosen to lie between 800 and 1400 Hz, with corresponding hole density ranging from 5 holes/foot to 16 holes/foot. In the preferred embodiment the hole density varies approximately linearly from one end of the tube wave absorber section to the other, with low frequency resonance condition at the transmitter end. Tube wave attenuation for the preferred embodiment is shown in FIG. 13, showing decibels of attenuation versus frequency over a temperature range commonly encountered in acoustic logging. Another implementation of transverse impedance elements particularly suited to lower frequencies, such as may be used in echo logging of distant geological structures, comprises a slot filled with absorbing metal foam; resonant frequency depends on depth of the slot, which is adjusted for the desired stop band along the length of the absorber section.

It is an additional feature of the present invention that the tube wave absorber also absorbs energy from vibrational waves propagating through the tool body. Referring to FIG. 1A, a vibrational wave 52 may arise from action of the transmitter section 26, propagate through the tube wave absorber section 28, and pass into the receiver section 30. The vibrational wave 52, when propagating through the tube wall 140 of the absorber section, causes said tube wall to flex and vibrate. This vibrational motion induces fluid flow through the absorbing elements, causing energy to be dissipated and the vibrational motion to be attenuated before it passes to the receiver section 30. Compensation for such vibrational waves is provided within the receiver section 30 as described below.

The Receiver Section

Now referring to FIGS. 14A and 14C, there is shown the receiver section 30 of the present invention. This receiver section is constructed from a thick-walled steel tube 154 containing a multiplicity of receiver assemblies 156. In the preferred embodiment sixteen receiver assemblies are disposed as a sequence of four axially spaced apart receiver stations, each station having four receiver assemblies situated at 0°, 90°, 180°, and 270° azimuthal locations around the circumference of the tool.

Construction of a receiver assembly 156 is illustrated in FIGS. 15A, 15B and 15C. A first or outer piezoelectric crystal stack 158, (FIG. 15B) called the pressure crystal, is firmly mounted (as by a suitable adhesive such as epoxy) to a mounting plate 162. The outer face of the pressure crystal 158 is in planar contact with a metal piston or contact plate 164 which is directly exposed to the borehole fluid pressures surrounding the tube 154. This piston is supported within a pressure isolation ring 166, provided with conventional o-ring seals 167. Thus, the sides of the pressure crystal 158 are protected from the borehole fluid pressures by the pressure isolation ring 166 which is "floating", i.e. not rigidly attached to the receiver tube 154. The ring 166 is secured from falling out of the tube 154 by means of a conventional snap-ring 169. Fixed to the opposite or under side of the mounting plate 162 is a second piezoelectric crystal stack 160, called the acceleration crystal. Both the pressure crystal 158 and the acceleration crystal 160 are constructed in an identical fashion, as shown in FIG. 15B. Each crystal stack, as shown in FIG. 15B, comprises alternating disks of piezoelectric material PZT-4 and insulating disks of aluminum oxide, the disks of piezoelectric material being electrically connected in parallel. In the preferred embodiment each crystal stack is approximately 1 inch in diameter and one inch long.

During a logging operation for the tool 10, the receiver assembly 156 is insensitive to undesirable vibrations of the tool body 154. The pressure crystal 158, being mounted on the tool, is exposed to vibrational acceleration of the tool body. Since the piezoelectric stack responds to acceleration forces in a similar manner to pressure forces, the output signal is a superposition of a desired pressure signal and an undesirable "noise" due to tool acceleration, as illustrated in FIG. 16.

In the embodiment illustrated in FIG. 15A, tool acceleration is communicated to the pressure crystal 158 solely through the rigid mounting plate 162 which is secured to the tool body 154 by screws 155. Since the pressure isolation ring 166 is floating and not rigidly connected to the tool, no vibration is communicated to the pressure face of the crystal. The rigid mounting plate 162 provides the sole path for tool vibration to be communicated to the pressure crystal 158, and exactly the same vibrational motion is communicated to the acceleration crystal 160. The acceleration crystal 160, being identical in construction and rigidly connected to the opposite face of the mounting plate 162, provides a measurement of acceleration response identical to the pressure crystal, but of an opposite polarity. As illustrated in FIGS. 16A to 16C, adding the signal from the acceleration crystal 160 (FIG. 16B) to the signal from the pressure crystal 158 (FIG. 16A) provides a combined compensated output (FIG. 16C) signal that responds only to borehole pressures, and is insensitive to tool vibration.

Another feature of each receiver assembly 156 is that provision is made for individual calibration of each piezoelectric crystal. Referring to FIG. 17, there is shown a conventional analog electronic circuit which provides for separate pre amplification for each crystal. This circuit includes a calibrated gain amplifier 157 which adjusts the gain of each crystal to meet a specified standard for response to applied force. The gain is adjusted so that each crystal provides 40 millivolts per newton of applied force on the crystal. Calibration force is applied with a calibration force standard such as the Dynapulse force hammer manufactured by Dytran Instruments, Inc. In the preferred embodiment there are 32 calibrated crystal circuits, comprising two crystals for each of 16 receiver assemblies. The calibrated outputs of the pressure crystal and the acceleration crystal for each receiver assembly are electronically combined at a summation junction 159 by conventional analog circuitry, providing a calibrated signal that responds only to borehole pressures and not tool vibration. The output of the summation junction is furnished to a band pass filter 61 whose output is supplied to a programmable gain amplifier 163. The programmable gain amplifier 163 is digitally controlled by the controller 245. The output of the programmable gain amplifier is furnished to an A/D converter 165. Each calibrated pressure signal is then passed through conventional electronic circuitry, including a band pass filter 182, programmable gain, sample and hold, and analog-to-digital converter.

Referring again to FIG. 2, the signals from thirty-two piezoelectric crystals in the receiver section 30 pass into the preamplifier section 32 where they are separately calibrated and combined in the preamplifier bank 326 to provide sixteen channels of calibrated pressure signals. The analog signals are passed to the data acquisition section 34, where they are converted to digital signals in the A/D converter bank 328. The sixteen channels of digital data are passed to the command section 22 via line 259, which transmits them through the wireline cable 12 to the surface module 40.

It is another feature of this invention that provision is made for separate calibration, digitization, and transmission of each receiver assembly, which for the preferred embodiment illustrated in FIGS. 14A and 14B comprises four axial stations of four receiver assemblies for each station. In subsequent digital processing, receiver assembly outputs may be combined to match desired acoustic modes. Thus, for example when a monopole transmitter in accordance with FIG. 5A is fired, in which opposite sides of the tool are excited with a positive pulse, the corresponding receiver assemblies illustrated in FIG. 14B are combined to match transmitter excitation by adding the output at 0° azimuth to that at 180° azimuth. Similarly, when the x-dipole transmitter is fired, as illustrated in FIG. 5B, the receiver assemblies at 0° azimuth and 180° azimuth are combined with opposite polarity. It is readily seen that any transmitter configuration shown in FIGS. 5A through 5E may be matched by corresponding combinations of the separate receiver assemblies at any selected axial measurement station. Furthermore, by measuring, for example, monopole acoustic waves at the receiver station when dipole waves are excited by the transmitter, it is possible in the present invention to provide a means of assessing the quality of acoustic excitation. In the ideal situation, when dipole waves are excited by the transmitter 26 only dipole waves are received at the receiver 30, and the same is true for other acoustic wave modes. In practice, due to imperfections in transmitter operation or to asymmetrical borehole shapes or formation properties, there may be mode conversion between, for example, monopole and dipole, or x-dipole to y-dipole. The ability to reconstruct acoustic modes by combining separate calibrated signals and to measure mode conversion is a novel feature of this invention.

Operation of Tool and Acquisition of Data

In order to provide an acoustic well log with the present invention the tool operator first determines which transmitter modes are best suited for the logging situation. For example, it is known that in most open-hole (uncased) wells the monopole transmitter is best suited for exciting compressional waves in the formation, and the dipole transmitter is best suited for exciting shear waves in the formation. In the preferred embodiment two modes of transmitter operation are provided for a single trip through the well, so that for open-hole well-logging the operator commonly selects the monopole and the x-dipole transmitter. Referring now to FIG. 1, the operator lowers the tool 10 into the well by means of the winch 40 and the sheave 36. The tool is lowered to a predetermined depth, and data acquisition commences as the tool is slowly raised. Referring to FIG. 2, a timed sequence of digital commands is issued by the logging computer 210 and transmitted to the tool computer 250 through the wireline 12. These digital commands ensure that the tool fires preselected transmitters at preselected locations; for example, the digital commands may cause the monopole transmitter to fire at a specific location, followed within a small fraction of a second by firing the dipole transmitter. The time interval between monopole and dipole firing is so short that the tool does not move appreciably between them. After a suitable interval of time, when it is determined that the tool has been raised exactly one foot, the firing sequence is repeated.

For each transmitter firing at each depth, full-wave acoustic data is acquired from the receiver assemblies 321,322, 323 and 324 (FIG. 2), with digital data passing from the tool computer 250 to the surface computer 210 and stored in digital data storage 220. Raw data, i.e. unprocessed data, comprises digital wave form recordings from all receivers, at all depths, from all selected transmitters.

The operator monitors progress of the log by viewing waveform data from selected receivers on the display unit 230. Ordinarily, in an ideal situation, the received raw data exhibits an acoustic mode determined by the selected transmitter. That is, when firing in monopole mode, the received signal is symmetric, in that the pressure waveform on one side of the tool is identical to the pressure waveform on the other side of the tool. Similarly, when firing in dipole mode, the pressure waveform on one side of the tool is exactly the negative of the pressure waveform on the other side of the tool. In extraordinary cases, caused for example by the tool not being properly centered in the borehole, or an asymmetric borehole, or an imperfect transmitter, it may happen that the received waveforms do not match the transmitter mode. In prior logging tools, it was always assumed that receiver mode matched transmitter mode. Separate waveforms were not provided for different sides of the tool, and there was no way to identify extraordinary situations. It is a feature of the present invention that separate waveforms from each side of the tool are measured. The operator may correct for problems identified by monitoring the raw waveforms, or in some cases may continue the logging operation in problem situations; the availability of the raw waveforms greatly aids interpretation and processing of the acoustic log in these problem situations.

Cased-hole wells are considerably more difficult to log than open-hole wells. In some cases the operator may be successful using the monopole transmitter to excite compressional waves in the formation, but frequently the tube wave is so large as to cause substantial measurement difficulties. In that situation the quadrupole transmitter is commonly used to excite compressional waves and suppress tube waves, and the dipole transmitter is used to excite shear waves in the formation.

For rapid acquisition of data it is possible to use only a single transmitter operating in the unipole mode (which may be shown to be a sum of monopole, dipole, quadrupole, and higher multipole modes). In that case only a single shot is fired at each depth point, and the tool may be raised at twice the rate of a two-transmitter configuration.

Data Processing

A representative pressure waveform that may be acquired from a selected receiver with the transmitter operating in a selected mode is schematically illustrated in FIG. 18A. The trace typically comprises a compressional wave 300 and a shear wave 310. The compressional wave 300 typically arrives at an earlier time and includes higher frequency components than the shear wave 310. Wave forms also typically include noise from undesirable waves (not shown), each of which has its own arrival time and its own frequency components.

The objectives of digital processing in the present invention are: 1) to single out selected wave types, for example compressional waves, by simultaneously identifying time of arrival and wave frequency (within limits imposed by the well-known Heisenberg uncertainty principle); and 2) to provide a mathematically exact measure of phase velocity of the propagating wave.

Digital processing steps in the present invention which achieve these objectives are illustrated schematically in FIG. 18B. In the first step a conventional digital Fast Fourier Transform 171 is taken of the digital data, a process well known to those versed in the art. In the preferred embodiment, digital data representing, for example, the x-dipole data for the first receiver station, is collected in a frame comprising 1024 samples over a time period of approximately 18 milliseconds. After Fourier transformation, the signal is represented by a spectrum ranging from 0 to approximately 28 kHz, with both positive and negative frequencies.

In a new processing step the spectral data is next passed through a "Heisenberg filter" 173, that is, a filter providing both a limited frequency response and simultaneously a limited time response (i.e. a short impulse response). It is known from quantum theory that no filter can be designed which measures both the exact frequency and the exact time of arrival of a wave. The product of frequency uncertainty and time uncertainty is governed by the well-known Heisenberg uncertainty relation. Conventional narrow-band filters designed on the basis of poles and zeroes in the complex plane are not optimum when considered both from the frequency response and time response perspective. A narrow-band filter based on high"q" resonances, for example, tend to "ring" in the time domain; that is, a limited response in the frequency domain corresponds to an extended and undesirably oscillatory response in the time domain. Such a filter, when applied to the measurement of a propagating acoustic wave, seriously distorts the time response and prevents an accurate measurement of phase velocities.

A Heisenberg filter that has been extensively analyzed is the Gaussian filter, in which the normalized spectral response for a frequency f (which may be positive or negative) is provided in terms of the filter parameters: center frequency $f_0$; frequency uncertainty $\Delta f$; and time uncertainty $\Delta t$. The Gaussian filter frequency response G together with the corresponding time response g are given by the following equations:

$$G(f,f_0) = \exp\left[-\pi\Delta f\Delta t\left(\frac{f-f_0}{\Delta f}\right)^2\right] \qquad EQ.\_1$$

$$g(t) = \sqrt{\frac{\Delta f}{\Delta t}}\, \exp\left[2\pi j f_0 t - \pi\Delta f\Delta t\left(\frac{t}{\Delta t}\right)^2\right] \qquad EQ.\_2$$

If uncertainty is defined by the frequency band beyond which the normalized spectral response is reduced below 10 dB, and correspondingly the time interval beyond which the normalized time response is reduced more than 10 dB, it is readily determined that the product of frequency uncertainty by time uncertainty for the Gaussian filter is a constant $$(\Delta f\Delta t)_{-10dB} = 0.366468 \qquad EQ.\_3$$

A new and improved Heisenberg filter for processing acoustic wave data is provided in accordance with the present invention. The improved filter frequency response H is defined in EQ. 4. The time response h may be evaluated from the frequency response (H) by an inverse Fourier transform which results in EQ. 5 defined below.

$$H(f,f_0) = \exp\left[-2\pi\Delta f\Delta t\sqrt{1+\left(\frac{f-f_0}{\Delta f}\right)^2}\right] \qquad EQ.\_4$$

$$h(t) = 2\Delta f \exp[2\pi j f_0 t]\frac{K_1\left[2\pi\Delta f\Delta t\sqrt{1+\left(\frac{t}{\Delta t}\right)^2}\right]}{\sqrt{1+\left(\frac{t}{\Delta t}\right)^2}} \qquad EQ.\_5$$

In EQ. 5 the function $K_1$ is known as a Modified Bessel Function (see, for example, M. Abramowitz and I. Stegun, *Handbook of Mathematical Functions*, Dover Publications, 1972, p. 374). It is more conveniently represented in asymptotic form valid for large values of the argument, a condition commonly satisfied in wave processing applications. The asymptotic representation of the time response h is given by the following equation:

$$h(t) \approx \sqrt{\frac{\Delta f}{\Delta t}}\left[1+\left(\frac{t}{\Delta t}\right)^2\right]^{-3/4}\exp\left[2\pi j f_0 t - 2\pi\Delta f\Delta t\sqrt{1+\left(\frac{t}{\Delta t}\right)^2}\right] \qquad EQ.\_6$$

The new Heisenberg filter also satisfies an uncertainty relationship comparable to the Gaussian filter:

$$(\Delta f\Delta t)_{-10dB} = 0.442366 \qquad EQ.\_7$$

As shown in FIGS. 19A and 19B, response magnitudes of the new Heisenberg filter (designated 172) and the Gaussian filter (designated 170) are shown as a function of frequency (normalized to $\Delta f$) and time (normalized to $\Delta t$). In both filters the response (expressed in decibels) drops off very rapidly, the difference being that the Gaussian filter drops off quadratic ally as a function of either frequency or time, while the new filter drops off linearly as a function of either frequency or time. Extensive experimentation with the new Heisenberg filter have demonstrated that the "softer" fall-off of attenuation, linear rather than quadratic, yields superior results in practical wave analysis. Neither the Gaussian filter nor the new Heisenberg filter may be accurately represented by conventional filter design using a finite number of poles and zeroes in the complex plane. The exponential response curve in both frequency and time is the result of higher order (usually called "essential") singularities in the complex plane. Unlike filters designed with a finite number of poles and zeroes, there are no undesirable oscillations in response magnitude in either frequency or time.

In the new processing step 173 using a Heisenberg filter the real digital signal is first passed through a conventional digital Fourier transform 171, yielding a series of complex coefficients representing the decomposition of the real signal into the sum of positive and negative frequencies. Likewise, for a selected center frequency $f_0$, a real Heisenberg filter is represented as the sum of a complex Heisenberg filter at the positive frequency $f_0$, and a complex Heisenberg filter at the corresponding negative frequency $-f_0$. In the processing step 173 each complex Fourier coefficient is multiplied by the corresponding value of the real Heisenberg filter.

The filtered Fourier coefficients are reconstituted into an analytic waveform containing both real and imaginary components using the well known Hilbert transform 175, as illustrated in FIG. 18B. The Hilbert transform is an inverse Fourier transform in which the negative frequency components are nulled. If the negative frequency components were to be included, a real waveform would result. By nulling the negative frequency components a complex waveform is generated with the same real part and a new imaginary part, representing the analytic extension of the real waveform into the complex plane. The new combination of processing steps using digital Fourier transformation 171, Heisenberg filtering 173, and Hilbert transformation 175 of the present invention provides an analytic waveform, containing both real and imaginary components, which optimally locates the time of arrival of an acoustic pulse while simultaneously restricting its frequency content.

A further benefit of the combination of Heisenberg filtering with Fourier transformation and Hilbert transformation is that the phase of the acoustic wave is accurately preserved without corruption by digital processing. In conventional phase analysis using Fourier transforms phase information is obtained directly from the digital Fourier coefficients. Through use of the Heisenberg filter, commonly recognized problems associated with the finite number of samples and the discontinuities at the end of the window are eliminated.

It is well known that compressional waves and shear waves are excited in a borehole environment at different frequencies. A broad band of acoustic energy is provided by the new acoustic transmitter of the present invention, as illustrated in FIG. 6D. The response of the formation is: 1) production of a shear wave, traveling at shear wave velocity, with a peak frequency depending on borehole size and acoustic mode; 2) production of a compression wave, traveling at compressional wave velocity, with a frequency (different from shear wave frequency) depending on borehole size and acoustic mode. In addition, the acoustic source may excite tube waves, as described earlier, which travel at tube wave velocity (depending on both drilling fluid properties and formation properties), and typically have a much lower frequency component than either compressional waves or shear waves.

In the present invention a selected wave component, for example the shear wave, may be separated from other wave components by selecting the Heisenberg filter frequency to be the peak frequency for that component. The sharp roll-off of response with frequency, as illustrated in FIG. 19A, causes the competing components to be strongly attenuated. It is also a feature of this invention that the frequency limitation of the Heisenberg filter is simultaneously associated with an optimum identification of the time of arrival of the acoustic pulse, providing for an accurate determination of acoustic velocity. Since the peak frequency of the selected component depends on both formation properties and borehole size, the present invention provides for automatic tracking of peak frequency during the processing of an acoustic log, using conventional tracking methods.

It is to be understood that an experimental logging run provides digital data with a broad range of frequencies (typically 100 to 10,000 Hz), and that separation of the data into distinct wave components occurs after the log has been run. compression wave frequencies for typical logs are usually in the range 2–5 kHz; shear wave frequencies are lower, typically 1–3 kHz. It is a further feature of this invention that the relative concentration of wave components is controlled by selecting a particular acoustic mode for transmitter and receiver; thus the monopole mode is typically selected for compression waves in an open hole, the dipole mode is typically selected for shear waves in an open hole, and the quadrupole mode is sometimes used for both shear and compression waves in a cased hole. Each mode excites both shear and compression waves, although in different ratios, and the monopole mode additionally excites a tube wave. A description of the interplay between acoustic mode and excitation amplitudes is to be found in Winbow, loc cit.

In the preferred embodiment of the present invention, there are four receiver stations 321, 322, 323 and 324 axially located on the tool, as illustrated in FIG. 14A. Each receiver station, numbered in sequence from the transmitter (uphole) end of the receiver section 30, comprises four receiver assemblies 156 as shown in FIG. 14B. Now consider, for example, the acquisition of digital data for an x-dipole acoustic log. In a dipole log, the dipole transmitter is selectively caused to fire, as illustrated for example in FIGS. 8A and 8B, with exit holes as illustrated in FIG. 5B. Digital data is acquired for each receiver assembly at, and combined to form a dipole response in a manner exactly matching the transmitter mode. For example, in the x-dipole transmitter shown in FIG. 5B, a positive pulse exits from the top and a corresponding negative pulse exits from the bottom; therefore the x-dipole mode corresponds to opposite polarity on opposite sides of the tool. Correspondingly, in combining the separate signals from the separate receiver assemblies illustrated in FIG. 14B, the top receiver assembly response is added to the combination response, while the bottom receiver assembly response is subtracted from the combination response. The combined signal from the receiver station, therefore, represents the x-dipole response in which the opposite sides of the tool are combined with opposite polarities. The x-dipole response is determined at each station in a similar manner, yielding four digital waveforms representing response to the x-dipole mode at each of the four axial stations shown in FIG. 14A. The digital addition and subtraction of received data to reconstruct acoustic modes is a processing step that takes place after the data has been digitally acquired by the downhole module 10 and transmitted to the uphole module 40, as schematically illustrated in FIG. 2. It is apparent that the uphole receiver processing can reconstruct any selected transmitter mode, such as monopole, x-dipole, y-dipole, quadrupole, or unipole.

In addition, it is a feature of this invention that uphole processing can monitor for quality control or formation analysis purposes any possible mode conversion, in other words, receiving in a different mode from the transmitter, e. g. transmitting in x-dipole mode and measuring in y-dipole mode.

In the preferred embodiment combined digital data from each of the four axial measurement stations, representing tool response to a selected acoustic mode, is processed by Fourier transform 171, Heisenberg filter 173, and Hilbert transform 174 as illustrated in FIG. 18B. The resulting analytic waveform, comprising both real and imaginary components, determines at each time the instantaneous phase of the propagating wave. This analytic waveform provides the data for determining the phase velocity of an acoustic wave. Phase velocity is determined from the time of arrival of selected phase points at each receiver station in an additional processing step 177 as described below.

Referring now to FIGS. 20A–20D, there is illustrated a sequence of real waveforms that may be obtained at the four receiver stations of the preferred embodiment. Each waveform, after Heisenberg filtering, represents a pulse of acoustic energy in a narrowly defined frequency range with a well defined time location. Typically there are three or four cycles of acoustic energy, as shown in FIG. 20A. For each waveform, the phase as a function of time may be determined. In FIGS. 20A–20D three selected phase points are shown for illustration, the selected phase points being the same for each of the four waveforms. Between each pair of receivers, there is a delay in arrival of a particular phase point due to the phase velocity of the propagating acoustic wave. Thus, between receiver #1 and receiver #2 there is a time delay $\Delta T_1$, (FIG. 20B) between receiver #2 and receiver #3 there is a time delay $\Delta T_2$, (FIG. 20C) and between receiver #3 and receiver #4 there is a time delay $\Delta T_3$ (FIG. 20D).

It is a feature of the present invention that accurate evaluation of the phase velocity of a selected wave using the processing steps of FIG. 18B is determined by combining a multiplicity of phase arrival time delays. For each selected phase point, there are three time delays, corresponding to the spacings between the four receiver stations of the logging tool 10. The processing steps of Fourier transform, Heisenberg filtering, and Hilbert transform provide a multiplicity of phase points, each of which may be used to determine phase arrival time delay. In the preferred embodiment of the invention a preselected number of phase points per acoustic cycle, up to a maximum of 32, is used in processing. There may be four acoustic cycles in the measured pulse, corresponding to a maximum of 128 different phase points, each of which has three time delays between measuring stations, yielding a maximum of 384 independent measurements of phase arrival time delay for each acoustic pulse.

It is a further feature of this invention that a multiplicity of phase arrival time delays may be collected for each specific interval of formation by combining data from overlapping positions of the tool. For example on the first firing of the tool a specific layer of formation may lie in the interval between measurement station #1 and #2; at the next firing of the tool, as the tool moves up the borehole, the same layer lies between measurement station #2 and #3; at the third firing of the tool the same layer lies between measurement station #3 and #4. In the preferred embodiment this multiplicity of data for a specific layer of formation is combined with conventional statistical processing to yield an average phase time delay, together with a standard deviation for monitoring accuracy of the measurement. It is a feature of this invention that the vertical resolution is determined by the distance between receivers (one foot in the preferred embodiment). It is a further feature of this invention that the multiplicity of phase arrival data may be corrected for dispersion effects in the formation, for example by fitting the data to a mathematical model of dispersion, thereby providing improved measurements of true acoustic phase velocity.

In summary, this invention provides a powerful new acoustic logging system which includes a new acoustic transmitter able to excite useful acoustic waves over a broad range of frequencies and a multiplicity of operating modes; a new absorber for reducing undesirable acoustic waves; a new receiver which reduces effects of undesirable tool vibration and provides independent measurements from all sides of the tool; and new processing steps which provide selective separation of a desired acoustic wave on the basis of frequency and time of arrival so as to determine true acoustic phase velocity of the wave. It is apparent that each of these features improves measurement reliability, and in combination provides an entirely new capability for measuring acoustic wave velocities in earth formations surrounding a borehole, even when the borehole is cased with steel.

To those skilled in the art to which this invention relates, many changes in construction and widely differing embodiments and applications of the invention will make themselves known without departing from the spirit and scope of the invention. The disclosure and the description herein are purely illustrative and are not intended to be in any sense limiting.

What is claimed is:

1. For use in an acoustic logging system that includes a logging tool adapted to be moved through a borehole in the earth and comprising a transmitter section and a receiver section spaced from said transmitter section, wherein said transmitter section produces sonic waves at periodic intervals which are received as wave signal data by said receiver section, a method for analyzing the received wave signal data which comprises the steps of:

processing the received wave digital signal data using Fourier transform procedures;

filtering the processed data using a Heisenberg filter procedures;

using a Hilbert transform to refine filtered data; and using the refined data to provide a phase velocity analysis.

2. The method as described in claim 1 wherein said Heisenberg filtering step comprises the steps of:

passing real digital signal data through a digital Fourier transform to yield a series of complex coefficients representing the decomposition of each real digital signal into the sum of positive and negative frequencies;

multiplying each complex Fourier coefficient by a corresponding value of the real Heisenberg filter;

reconstituting the filtered Fourier coefficients into an analytic waveform containing both real and imaginary components using said Hilbert transforms.

3. The method as described in claim 1 wherein said Heisenberg filter provides an improved filter frequency response H for a frequency "f" and a center frequency "$f_0$" which is defined as follows:

$$H(f,f_0) = \exp\left[-2\pi\Delta f\Delta t\sqrt{1+\left(\frac{f-f_0}{\Delta f}\right)^2}\right]$$

wherein $\Delta f$ is frequency uncertainty, and $\Delta t$ is time uncertainty.

4. The method as described in claim 1 wherein each said Hilbert transform comprises an inverse Fourier transform in which negative frequency components are nulled.

* * * * *